(12) United States Patent
McBrien et al.

(10) Patent No.: US 7,324,257 B2
(45) Date of Patent: Jan. 29, 2008

(54) LOW BIAS DRIFT MODULATOR WITH BUFFER LAYER

(75) Inventors: Gregory J. McBrien, Glastonbury, CT (US); Karl Kissa, West Simsbury, CT (US); Glen Drake, Windsor, CT (US); Kate Versprille, Manchester, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 233 days.

(21) Appl. No.: 11/189,449

(22) Filed: Jul. 26, 2005

(65) Prior Publication Data

US 2006/0023288 A1 Feb. 2, 2006

Related U.S. Application Data

(60) Provisional application No. 60/591,458, filed on Jul. 27, 2004.

(51) Int. Cl.
*G02F 1/03* (2006.01)
*G02F 1/035* (2006.01)
*G02F 1/29* (2006.01)

(52) U.S. Cl. ............... 359/245; 359/251; 359/252; 359/254; 359/315; 385/2

(58) Field of Classification Search ............ 359/245, 359/251–252, 254, 315; 385/1–3, 40, 129–132
See application file for complete search history.

(56) References Cited

U.S. PATENT DOCUMENTS

| | | | |
|---|---|---|---|
| 5,214,724 A | 5/1993 | Seino et al. | 385/2 |
| 5,359,449 A | 10/1994 | Nishimoto et al. | 359/181 |
| 5,404,412 A | 4/1995 | Seino et al. | 385/2 |
| 5,455,876 A | 10/1995 | Hopfer et al. | 385/2 |
| 5,680,497 A | 10/1997 | Seino et al. | 385/129 |
| 5,895,742 A | 4/1999 | Lin | 430/321 |

(Continued)

FOREIGN PATENT DOCUMENTS

JP 1789177 9/1993

OTHER PUBLICATIONS

"A novel wideband, lithium niobate electrooptic modulator," Samuel Hopfer, et. al., Journal of Lightwave Technology, vol. 16, No. 1, Jan. 1998, pp. 73-77.

*Primary Examiner*—Scott J. Sugarman
*Assistant Examiner*—DaWayne A. Pinkney
(74) *Attorney, Agent, or Firm*—Allen, Dyer, Doppelt, Milbrath & Gilchrist, P.A.

(57) ABSTRACT

The invention relates to an electro-optic modulator structure containing an additional set of bias electrodes buried within the device for applying bias to set the operating point. Thus the RF electrodes used to modulate incoming optical signals can be operated with zero DC bias, reducing electrode corrosion by galvanic and other effects that can be present in non-hermetic packages. The buried bias electrodes are also advantageous in controlling charge build-up with consequent improvement in drift characteristics. The bias electrode material is useful for routing bias signals inside the device, in particular to external terminals, as well as forming encapsulating layers to permit operation in non-hermetic environments, thereby lowering manufacturing costs. Embodiments using both X-cut and Z-cut lithium niobate ($LiNbO_3$) are presented. For the latter, the bias electrodes can be split along their axis to avoid optical losses.

22 Claims, 43 Drawing Sheets

U.S. PATENT DOCUMENTS

| | | |
|---|---|---|
| 6,195,191 B1 | 2/2001 | Osenbach et al. .......... 359/238 |
| 6,198,855 B1 | 3/2001 | Hallemeier et al. ............ 385/2 |
| 6,282,356 B1 | 8/2001 | Johnston, Jr. et al. ...... 385/129 |
| 6,310,700 B1 | 10/2001 | Betts ............................ 359/2 |
| 6,449,080 B1 * | 9/2002 | McBrien et al. ............ 359/245 |
| 7,127,128 B2 | 10/2006 | Belmonte et al. ............... 385/2 |
| 2002/0191266 A1 * | 12/2002 | Melloni et al. ............. 359/246 |
| 2003/0053730 A1 | 3/2003 | Seino ............................ 385/2 |
| 2004/0247225 A1 * | 12/2004 | Tavlykaev ..................... 385/8 |
| 2007/0116475 A1 | 5/2007 | McBrien et al. ............ 398/164 |

* cited by examiner

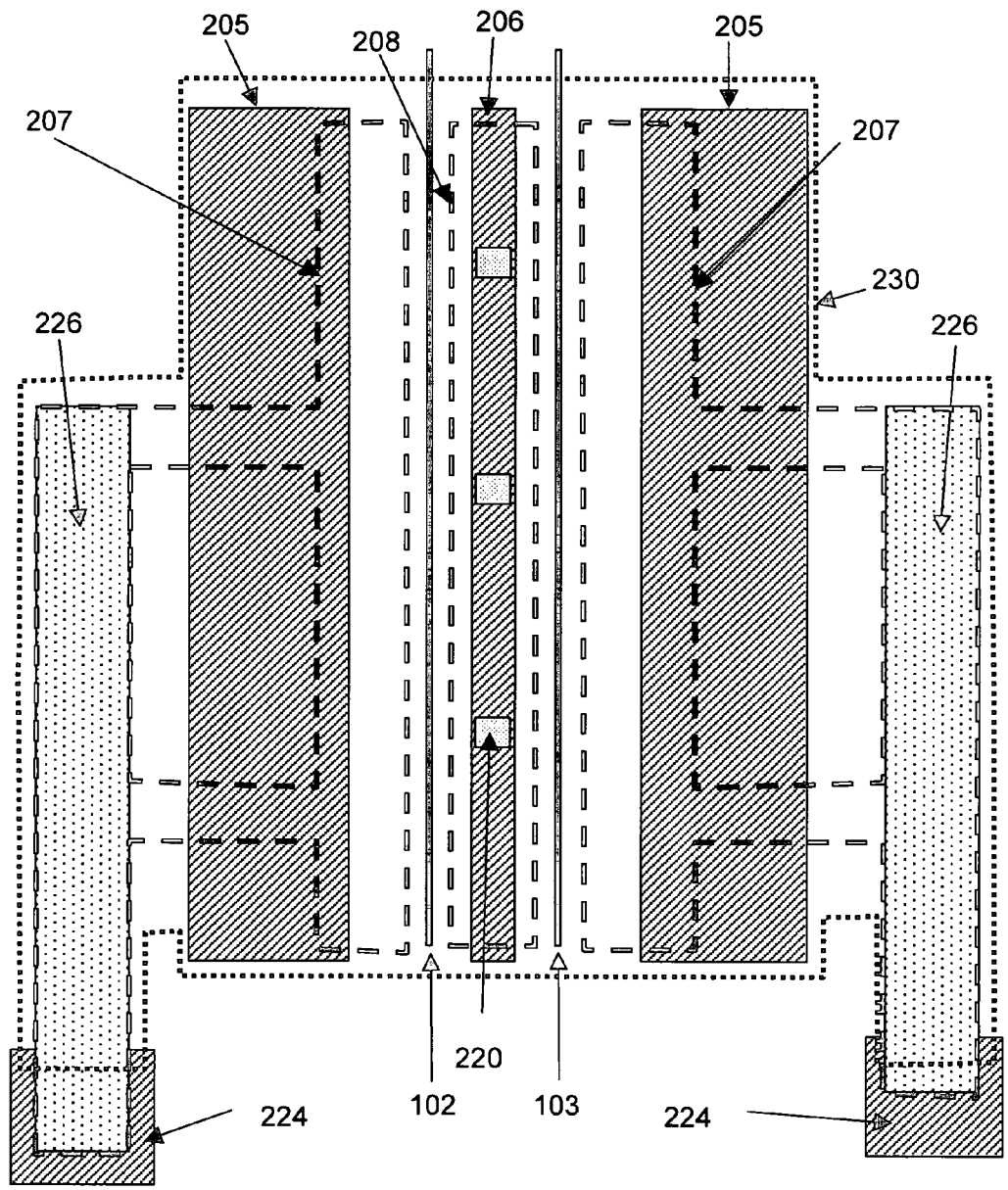

LOW BIAS DRIFT MODULATOR WITH BUFFER LAYER

CROSS-REFERENCE TO RELATED APPLICATIONS

The present invention claims priority from U.S. Provisional Patent Application No. 60/591,458 filed Jul. 27, 2004, entitled "Low Bias Drift Modulator with Buffer Layer" which is incorporated herein by reference.

TECHNICAL FIELD

The present invention relates to fiber-optic telecommunications optical devices and, more specifically, to optical devices which are manufactured with electrically non-conducting electro-optical materials.

BACKGROUND OF THE INVENTION

Fiber-optic telecommunications systems including a laser diode, an external modulator and a photodetector diode are well-known in the field for transmitting optical signals over optical fiber or similar optical waveguides. Chromatic dispersion in optical fiber tends to make the achievable transmission distance of fiber optic communications systems dependent on the modulation rate and the modulation chirp parameter. External modulators, when used to modulate the continuous wave (CW) input optical power from the laser, permit the modulation chirp parameter to be adjusted to a substantially fixed value in a predetermined, controllable manner, thereby minimising the transmission power penalty caused by chromatic dispersion.

External modulation is accomplished, for example, in a dual waveguide device wherein substantially identical input optical beams are supplied to the waveguides and wherein each waveguide is subject to its own individual control. Modulation signals are applied to each waveguide via the separate control. Moreover, control signals are applied to each waveguide for adjusting the modulation chirp parameter to a desired non-zero substantially fixed value.

Typical high-speed electro-optical external modulators use a traveling-wave electrode structure to form a microwave transmission line in the vicinity of the optical waveguide. A microwave signal co-propagates with an optical signal for a prescribed distance, thereby achieving the required optical modulation. To prevent velocity mismatch between the microwave signal and the optical signal in a traveling wave modulator, a thick buffer layer is provided on a wafer to speed up the propagation of the microwave signal. Previously, a silicon dioxide ($SiO_2$) buffer layer was created through known techniques such as electron beam, sputtering, or chemical vapor deposition (CVD). The buffer layer may be planarized throughout the wafer or may be patterned with electrode structures.

Using a $SiO_2$ buffer layer has numerous advantages. A $SiO_2$ buffer layer is produced by devices such as evaporators, sputtering machines, gas supply machines or CVD machines which permit a very precise control of production parameters such as layer thickness and composition. Both of these parameters influence the velocity of propagation of the electrical RF signal as well as the optical signal in the waveguide.

For many applications such as high-speed telecommunications systems, it is important to achieve a high modulation efficiency, which is generally measured in terms of the magnitude voltage $V_\pi$ (sometimes denoted $V_{pi}$) which needs to be applied to the modulator electrodes to achieve an optical phase shift of $\pi$ (pi). Typical design targets are 5 volts, however this may vary slightly from manufacturer to manufacturer. Lithium niobate ($LiNbO_3$) is an electro-optic material which can meet this design criterion.

It is used in two main crystallographic orientations: X-cut and Z-cut. The term X-cut or Z-cut $LiNbO_3$ refers to $LiNbO_3$ that is cut perpendicular to the X- or Z-crystallographic orientation respectively. The Y-cut is crystallographically equivalent to X-cut and therefore is covered in all descriptions where X-cut is treated.

Most applications require very stable performance of electro-optical modulator over time and through changes in temperature, humidity and other environmental conditions. $LiNbO_3$ is sensitive to temperature changes because the pyroelectric effect in $LiNbO_3$ creates mobile charge when temperature. The mobile charges can generate strong electric fields during normal operation of the device. Such strong electric fields are problematic because they can change the operating (bias) point of an electro-optic modulator, such as a Mach-Zehnder Interferometer (MZI), by creating fields across the waveguides that do not match one another. In addition, these strong electric fields can cause time dependent or uncontrolled charge dissipation, which may result in a loss of transmitted data. These fields may also cause arcing, which may also result in a loss of transmitted data.

There are methods known in the art for bleeding off pyroelectric charge. For example, in Z-cut substrates the pyroelectrically generated electric fields in a direction vertical to the modulator plane. Some prior art devices use a metal oxide or semiconductor layer that is formed on top of the device to bleed off pyroelectric charge through a conductive path to the bottom of the device. Both amorphous and polycrystalline-silicon (poly-Si) semiconductor layers have been used to bleed off pyroelectric charge. A diffusion-suppressing layer is sometimes included to prevent the metal electrodes from diffusing into the semiconductor bleed-off layer.

Other prior art devices use a conductive layer on the bottom of the device that is electrically connected with the ground electrodes to provide a discharge path. In these devices, charge accumulating on the hot electrode can find a path to ground through the driver or biasing electronics.

A problem associated with $LiNbO_3$ modulators is undesirable charge generation and charge redistribution that can occur when a bias voltage is applied to an electrical input of a $LiNbO_3$ Mach-Zehnder interferometric modulator. The bias voltage, applied to control the operating point of the Mach-Zehnder interferometer, can cause the formation of mobile charges, in the form of either electrons, holes, or ions. These mobile charges either counteract the effect of the applied voltage by establishing a positive DC drift, or enhance the applied bias voltage by establishing a negative DC drift. Positive drift is particularly problematic because the voltage required to maintain the bias condition will steadily increase ("run away") causing a control system reset to occur, which will result in loss of data. There are methods known in the art for reducing DC drift caused by undesirable charge generation and charge redistribution.

Prior art designs in U.S. Pat. Nos. 5,404,412 and 5,680,497 reduce the effect of the buffer layer charging by doping the buffer layer, causing it to be more conductive. The added conductivity in essence shorts out the buffer layer, preventing the buffer layer from charging up. A slowly varying voltage applied to the gold electrodes is able to control the bias point of a Mach-Zehnder Interferometer over time. Designs for x-cut lithium niobate may have a separate electrically isolated low frequency bias electrode, optically in series with the RF electrode. This separate bias electrode does not have a buffer layer between the electrode and substrate, eliminating problems associated with the buffer layer, however it increases the length of the device.

Designs for z-cut lithium niobate with separate bias electrodes are shown in U.S. Pat. No. 5,359,449. Z-cut lithium niobate electrode designs (bias or RF) typically require a buffer layer, as the electrodes must always be positioned over the waveguide. In some prior art lithium niobate designs, bias control is achieved with a separate bias electrode made of an optically transparent conductor, such as Indium Tin Oxide (ITO), placed on top of the waveguide.

Note that typically the entire device is usually placed in a hermetic package to prevent moisture from reaching the electrodes.

U.S. Pat. Nos. 5,895,742 and 6,198,855 B1 discuss designs using polymer buffer layers. The U.S. Pat. No. 6,198,855 B1 describes a z-cut device with a conductive or non-conductive buffer layer, with a bleed layer formed on top of the buffer layer, or directly on the surface. Note however that the bleed layer material is not patterned to form electrodes, nor does it provide a means to externally control the electric potential in the vicinity of the waveguides.

U.S. Pat. Nos. 6,195,191 B1 and 6,282,356 B1 describe means of treating the surface of the substrate to change conductivity or to reduce surface damage to improve bias stability. The use of bleed layers is also described. Note that the entire surface is treated. No attempt to create electrodes with the surface treatment is discussed.

Other prior art includes U.S. Pat. No. 5,214,724, where a semiconductive electrode is placed laterally next to the main signal electrodes. Note that all electrodes are on top of the buffer layer, in contrast to the invention described here, where the bias electrodes reside on the surface of the substrate. U.S. Pat. No. 5,214,724 teaches that a semiconductive electrode can be used for low frequency control of the bias point. Note that the claims also include a bleed layer, called a "primary semiconductive layer," between all the electrodes and the buffer layer.

Japanese patent 1789177 (grant date Sep. 29, 1993) describes a patterned buffer layer with a semiconductive bleed layer over top of the patterned buffer layer and on top of the surface of the substrate, in regions where there is no buffer layer.

In U.S. patent application publication 2003/0053730 A1, a transparent conductive film underneath a highly conductive metal electrode applies a voltage directly to the surface of the substrate. The metal electrode is shifted laterally with respect to the center of the waveguide to minimize optical loss. Note that the transparent conductive film is intended to carry both high and low frequency signals from the highly conductive electrode to the waveguide. As stated in the patent application, "the invention is particularly advantageous since it becomes possible to prevent optical loss and to achieve further high-speed modulation by forming a metal electrode so that the metal electrode may not be superimposed as much as possible on a part formed on an optical waveguide in a transparent electrode."

U.S. Pat. No. 5,455,876 describes a design with highly conductive (preferably gold) electrodes on the surface of the substrate and underneath the buffer, but with a floating electrical potential. The floating electrodes are DC isolated from the electrodes on top of the buffer and have no external DC connection. The floating electrodes are intended to improve high frequency modulation efficiency by capacitively coupling RF from the electrode on top of the buffer. Their proximity to the electrode results in efficient modulation for the fraction of voltage that is coupled. In a journal article by Samuel Hopfer, et. al., entitled "A novel wideband, lithium niobate electrooptic modulator," in the Journal of Lightwave Technology, Vol. 16, No. 1, January 1998, pp. 73-77, the inventor states that the purpose of the floating electrodes is "for the purpose of applying the available RF voltage directly across the titanium indiffused optical waveguides." Note that the floating electrodes do not provide any mitigation of the bias voltage drift due to the buffer charging effect, since they lack the external DC connection.

U.S. Pat. No. 6,310,700 is somewhat similar to U.S. Pat. No. 5,455,876, in that there is a set of large electrodes on top of a buffer layer, and a set of electrodes on the surface of the substrate. Instead of relying on capacitive coupling of the signal voltage from the upper to lower electrodes, conductive legs connect the two sets of electrodes. Note that the bottom set of electrodes are directly interconnected with the upper electrodes at both high and low frequencies. They are intended to carry the voltage from the top electrode to the bottom set of electrodes for all frequencies. The key feature to note is that the modulation is produced by the lower set of electrodes at high and low frequencies. The patent states, "the thickness of the buffer layer 400 should be thick enough such that the electric field 710 generated by the electrical signals propagating in the transmission line 300 does not reach the lithium niobate substrate slowing down the electrical velocity." If the field lines from the transmission line do not reach the substrate, then those field lines play a minimal role in modulation at both high and low frequencies. Furthermore, the patent teaches, "in particular, the conductive legs 350 must be long enough to elevate the transmission line 300 away from the substrate 100 such that the stronger parts of the electric field generated by the electrical signals propagating in the transmission line 300 (hereinafter the "electric field of propagation 710") does not reach the lithium niobate substrate 100 slowing down the electrical velocity. The electric field of propagation 710 (shown in FIG. 3) is generated across the gaps between the electrodes of the transmission line 300, but does not perform the modulation of the optical signals." Hence, the modulation at high and low frequencies is performed by the set of electrodes on the surface of the substrate, referred to as a "loading electrode." The patent also states that "the opposing loading electrodes of the opposing conductive legs generate a capacitance that reduces the electrical velocity on the transmission line to match the optical velocity of the optical signal," hence, the loading electrodes are strongly coupled to the transmission line at high frequency.

An object of the invention of this disclosure is to maintain efficient high frequency and low optical losses while at the same time reducing the charging effects on the device biasing, making the device more robust for non-hermetic packaging.

SUMMARY OF THE INVENTION

Accordingly, the present invention relates to an electrooptic device wherein high frequency modulation of an optical signal is achieved with a first set of highly conductive RF electrodes arranged as a transmission line on the top of the buffer layer, and a prescribed operating point is maintained by a second set of low conductivity electrodes in contact with the substrate.

In this way it is possible to operate the device with zero or nearly zero DC voltage between the highly conductive electrodes located on the surface of the device. As a result, metal migration and other effects which can cause electrode corrosion are mitigated, permitting reliable operation of the device in non-hermetic packages which are advantageous because of lower manufacturing and material costs.

Further, the electrodes located on the surface of the substrate, having an electrical connection to external terminals, can be used to eliminate substrate charging and similar effects, which would otherwise cause unstable device operation such as drift.

Another aspect of the present invention relates to the relative layout of the RF and bias electrodes for optimum modulation efficiency.

Another feature of the present invention provides for vias to connect the high resistivity bias electrodes to highly conducting electrodes to reduce the series resistance of the bias electrodes.

BRIEF DESCRIPTION OF THE DRAWINGS

The invention will be described in greater detail with reference to the accompanying drawings which represent preferred embodiments thereof, wherein:

FIG. 4e is a plan view of the electro-optic device in FIG. 4d;

FIG. 6b shows a cross-section A-A' in FIG. 6a;

FIG. 6c shows a cross-section B-B' in FIG. 6a;

FIG. 9b is a plan view of the device in FIG. 9a;

FIG. 22b is a cross-sectional view of an embodiment of a Z-cut electro-optic device showing the electric field generated when a voltage is applied to the split bias signal electrode on the right;

FIG. 15b shows a cross-sectional view of the embodiment in FIG. 15a;

DETAILED DESCRIPTION

Figure 1:
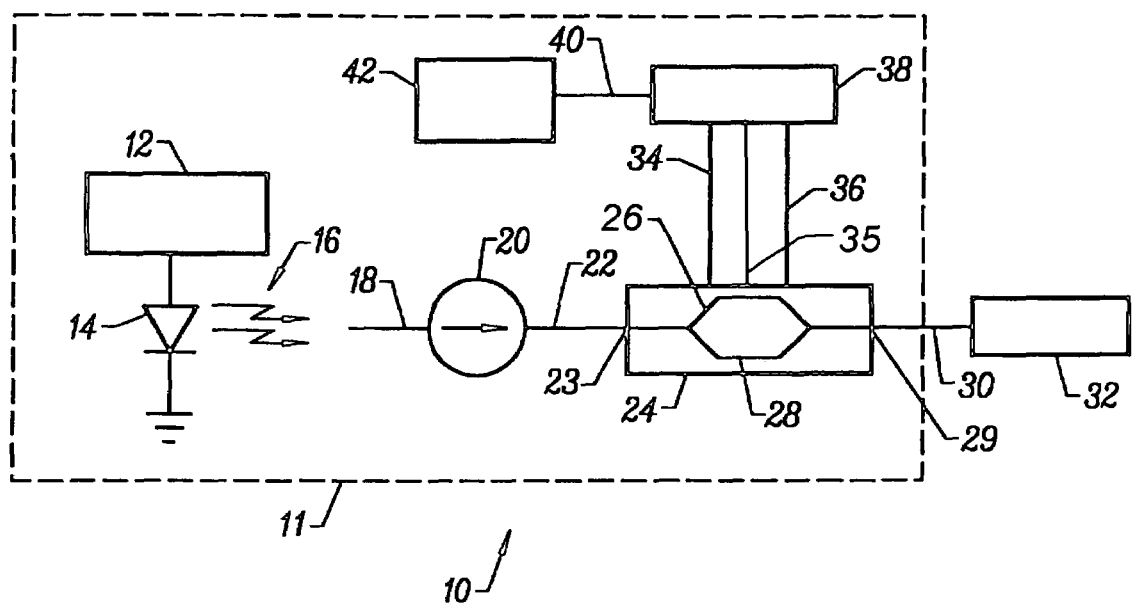
FIG. 1 is a simplified schematic diagram of an embodiment of an optical communication system.

With reference to FIG. 1, an embodiment of a simplified optical communication system 10 is shown, utilizing a modulator 24 of the present invention. The optical communication system 10 comprises a transmitter 11, a receiver 32 and a transmission medium 30, which connects the transmitter 11 to the receiver 32. The transmission medium 30 is typically an optical fiber.

The transmitter 11 includes a laser 14, which operates in accordance with laser control signals received from a laser controller 12. The laser 14, which may operate in continuous wave (CW) mode or pulsed mode, produces optical signals 16 having a prescribed wavelength. In long wavelength communications systems, the laser 14 is typically an InGaAsP/InP semiconductor single-mode laser which generates 1.5 micrometer wavelength optical signals.

A lensed optical fiber 18, or fiber pigtail, receives the optical signals 16. The lensed optical fiber 18 is coupled to the isolator 20, which reduces reflections directed towards the laser 14. In one embodiment, the isolator 20 is combined with a polarizer (not shown) to further reduce reflections to the laser 14. In another embodiment, the lensed optical fiber 18 is coupled directly to the modulator 24, rather than through the isolator 20.

An external modulator 24 receives the optical signals 16 from the laser 14 via an input fiber 22. The modulator 24 includes two waveguides 26 and 28. The controller 38 controls each waveguide 26, 28 independently of the other or with one control signal. The optical signals 16 are received at an input 23 of the modulator 24 and are modulated in each of the waveguides 26 and 28. Modulated optical signals from each of the waveguides 26 and 28 are combined into a modulated optical signal at an output 29 of the modulator 24. The modulator 24 may perform either amplitude modulation or phase modulation or some combination to "chirp" the light of the received optical signals 16. The combined, modulated optical signal is transmitted across the fiber 30 to the receiver 32.

The controller 38 receives digital data signals from a data source 42 via a transmission line 40, and generates modulation control signals in response to the received signals. The modulation control signals are introduced into the modulator 24 via leads 34 and 36. The modulation control signals are indicative of a predetermined modulation of the optical signals 16 and of desired modulation chirp parameters. For example, the modulation control signals are received by the modulator 24, and in response, the relative propagation velocities of each of the waveguides 26 and 28 changes to generate a desired modulation chirp parameter value. A single control signal may interact asymmetrically with waveguides 26 and 28 to produce a fixed amount of chirp.

The controller 38 also introduces a bias signal via lead 35 to the modulator 24 which sets the operating point of the modulator. The bias signal may be either preset or generated in response to changing environmental conditions such as temperature, bias drift or charge accumulation in the vicinity of the electro-optic waveguides.

One common modulator design is the Mach-Zehnder configuration. The operation of Mach-Zehnder modulators is described in detail in U.S. Pat. No. 5,455,876, which is incorporated herein by reference. A Mach-Zehnder modulator uses an interferometric technique in order to amplitude modulate the optical wave. A Mach-Zehnder modulator splits an incoming optical signal into two paths along optical waveguides and utilizes an electromagnetic signal, preferably a radio frequency (RF) signal, to modulate the split optical signals, which are in one or both optical waveguides. The two split optical signals are then combined into a single optical signal. Although the invention is described herein with a Mach-Zehnder modulator, the invention can be used with any type of electro-optical modulator.

Figure 2:
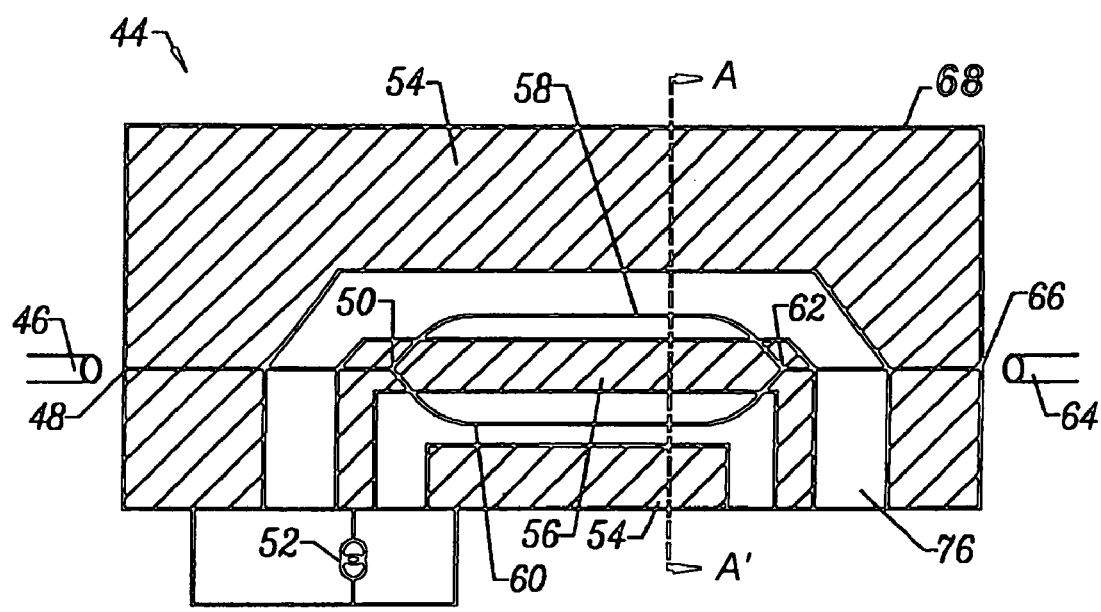
FIG. 2 is a top planar view of a modulator of the optical communication system of FIG. 1.

FIG. 2 illustrates a top planar view of a prior art modulator of the optical communication system of FIG. 1. A fiber optic cable 46 is in optical communication with an optical input 48 of a Mach-Zehnder modulator 44. The fiber optic cable 46 presents an optical signal from a light source or laser (not shown) to the input 48. The optical signal is split into two equal signals by a Y-connection 50. RF electrodes 54 and 56 conduct RF signals supplied by a signal generator 52. While the split optical signals travel down waveguides 58 and 60, the electrical field of the RF signal modulates the split optical signals. The distance in which the RF signals interact with, or modulate, the split optical signals is known as the interaction distance, and is determined primarily by the modulator design.

A second Y-connection 62 combines the two split optical signals into a single, modulated optical signal. A fiber optic cable 64 which is coupled to an optical output 66 of the modulator 44, presents the combined optical signal to subsequent stages (not shown) of an optical communication system.

The modulator 44 includes a substrate 68 which in one embodiment is made of X-cut lithium niobate (LiNbO$_3$) and is approximately 1000 microns (μm) thick. In another embodiment, the modulator 44 is made of Z-cut LiNbO$_3$. In order to maximize modulation efficiency, the waveguides lie between the electrodes for X-cut, while they are under the electrodes for Z-cut LiNbO$_3$. The length and width of the substrate 68 depend on the modulator design and must be sufficient to support the optical waveguides 58 and 60 and the RF electrodes 54 and 56. Other electro-optic materials can be used for the substrate 68 as well. In one embodiment, the optical waveguides 58 and 60 are positioned entirely within the substrate 68.

The waveguides 58 and 60 may be created by diffusing titanium into the substrate 68. In one embodiment, waveguides 58 and 60 are formed by creating a strip or channel (not shown) in the substrate 68, inserting titanium in the channel, and then raising the temperature of the substrate 68 so that the titanium diffuses into the substrate 68. In one embodiment, waveguides 58 and 60 are approximately seven (7) microns wide and approximately three (3) microns deep.

In one embodiment, the RF power electrodes 54 and 56 are formed from gold, but any conductive metal or metal alloy, such as silver or copper can be used. The RF electrodes 54 and 56 are formed using any of a number of known methods of adhering metal to substrate materials. In one embodiment, gold is deposited using electroplating or sputtering techniques. For example, a fifty (50) to eighty (80) Angstrom sublayer of titanium may be deposited to improve the adhesion of the gold to the substrate 68. A nickel sublayer may also be used, as it reduces galvanic corrosion at the gold-nickel interface in the presence of high humidity.

The RF electrodes 54 and 56 are connected to an RF transmission line which delivers RF power from the signal generator 52. In one embodiment, the RF transmission line comprises a coaxial cable. The center RF electrode 56 is connected to the center conductor of the coaxial cable which is connected to the output of signal generator 52. The shield or outer conductor of the coaxial cable is electrically connected to electrodes 54. For Mach-Zehnder modulators, the thickness and width of the RF electrodes 54 and 56 are determined by the design of the modulator.

Figure 3A:
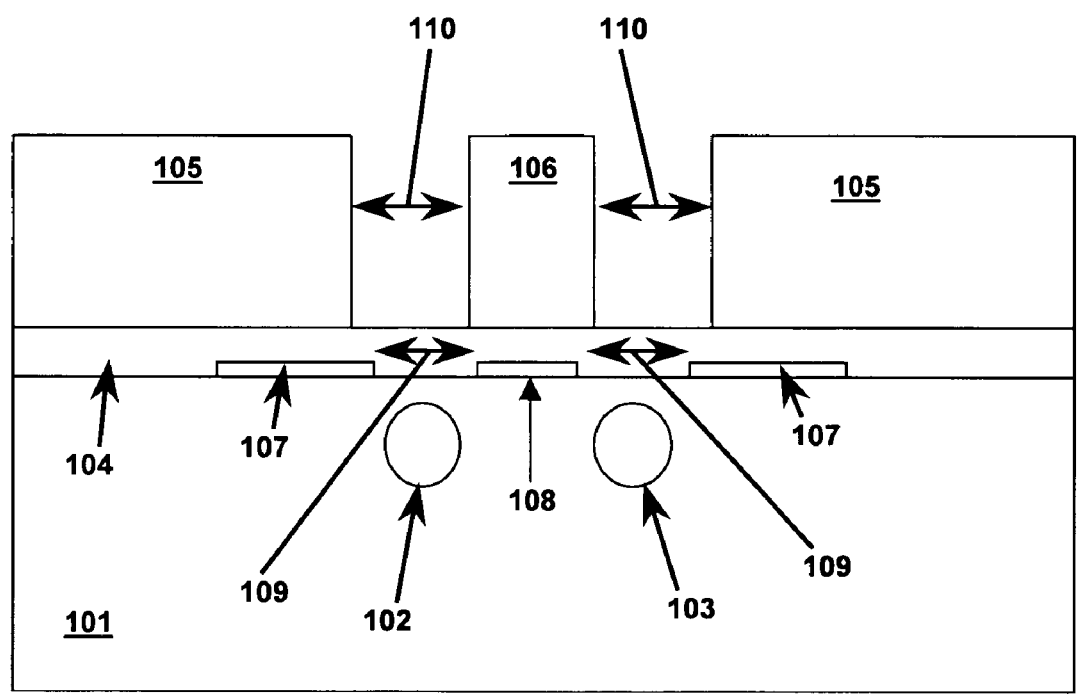
FIG. 3a is a cross-sectional view of the modulator of FIG. 2 taken along line A-A'.

FIG. 3*a* shows a cross-sectional view of taken along line A-A' of an embodiment of the modulator in FIG. 2 according to this disclosure. While the examples described herein are based on X-cut and Z-cut LiNbO$_3$ for substrate material, other electro-optic materials such as Y-cut LiNbO$_3$, all crystal cuts of lithium tantalate and semiconductors such as indium phosphide (InP) and related compounds could be used. The buffer layer 104 resides on the substrate 101 which contains two optical waveguides 102 and 103 constructed as described above. The traveling-wave electrode structure forming a microwave transmission line for carrying the RF signal over the interaction distance of the modulator consists of RF ground electrodes 105 and a RF signal electrode 106. The buffer layer, typically consisting of insulating materials such as silicon dioxide and benzocyclobutene (BCB), serves, amongst others, to match the propagation velocities of the RF and the optical signals and to provide a spacer between the highly conducting RF electrodes and the field propagating in the optical waveguide, thereby reducing losses in the optical signal.

The bias ground electrodes 107 and the bias signal electrode 108 are located on the substrate 101. Suitable materials for the bias electrodes are tantalum silicon nitride, amorphous silicon and other high-resistivity materials. Suitable resistivity values for the bias electrodes lies between that of gold or other conducting metals and that of the substrate. Typical resistivity values lie in the range of $10^{18}$ ohm-cm (Ω-cm) @25° C. for buffer layer, ~$1.3 \times 10^{17}$ ohm-cm (Ω-cm) @25° C. for lithium niobate substrate, ~$10^4$ to $10^6$ (Ω-cm) @25° C. for bias electrodes, and $2.3 \times 10^{-6}$ ohm-cm (Ω-cm) for the RF (Gold) electrodes.

The electric field in each optical waveguide 102, 103 is generated by a combination of the signal on the RF electrodes 105 and 106 and the signal on the bias electrodes 107 and 108. For any given signals applied to the RF electrodes 105, 106 and the bias electrodes 107, 108, the relative strength of the fields they generate is dependent on the relative magnitude of the inter-electrode gaps 110 and 109 respectively.

Figure 3B:
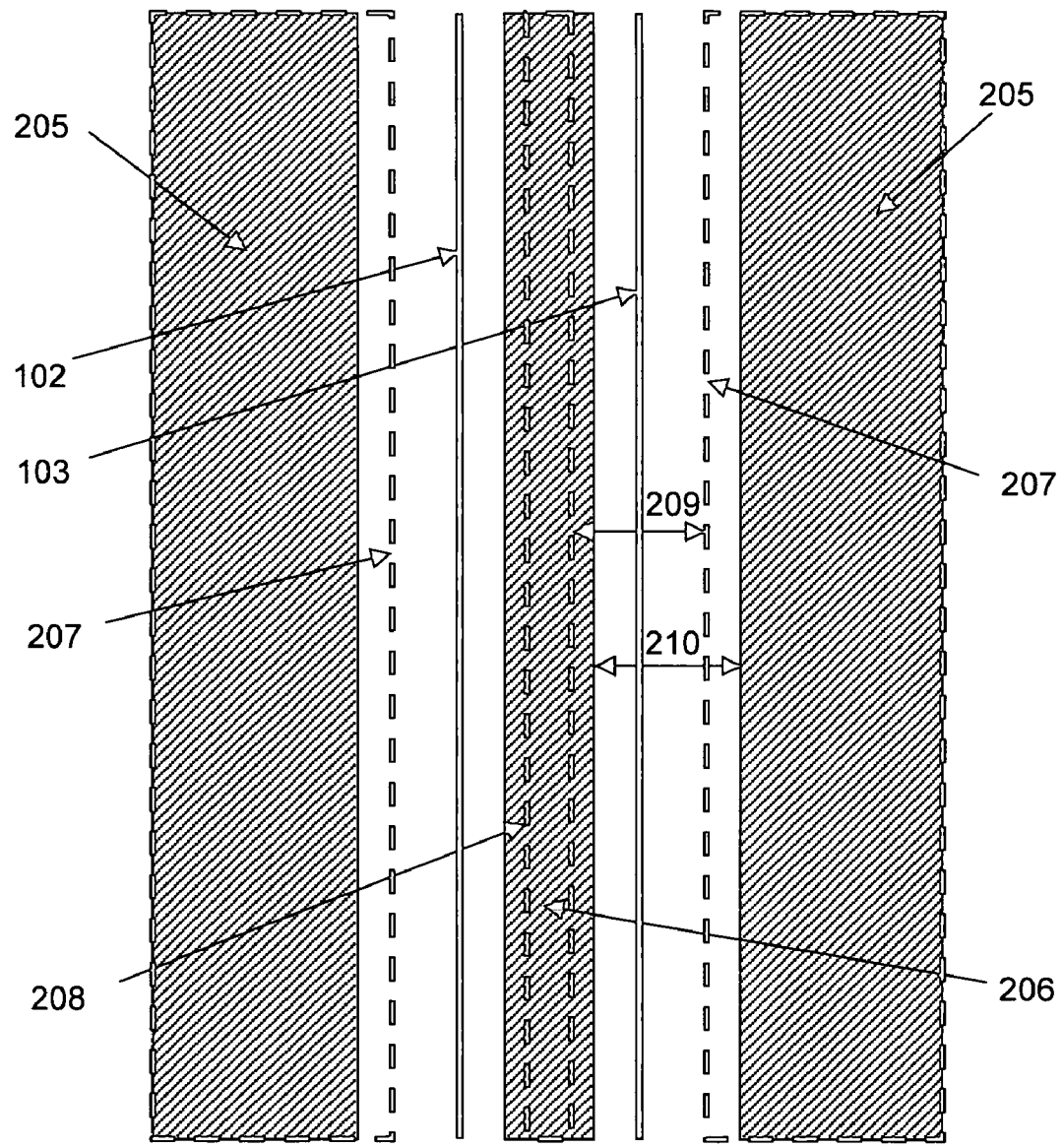
FIG. 3b is a plan view of the electro-optic device indicating the relation between the RF electrodes, the bias electrodes and the optical waveguides.

FIG. 3*b* is a top view of the device in FIG. 3*a* illustrating the layout of highly conducting gold RF signal and ground electrodes 206 and 205 respectively separated by the inter-electrode gap 210, the high resistivity signal and ground bias electrodes 208 and 207 respectively separated by the inter-electrode gap 209 and the two optical waveguides 102 and 103.

Figure 3C:
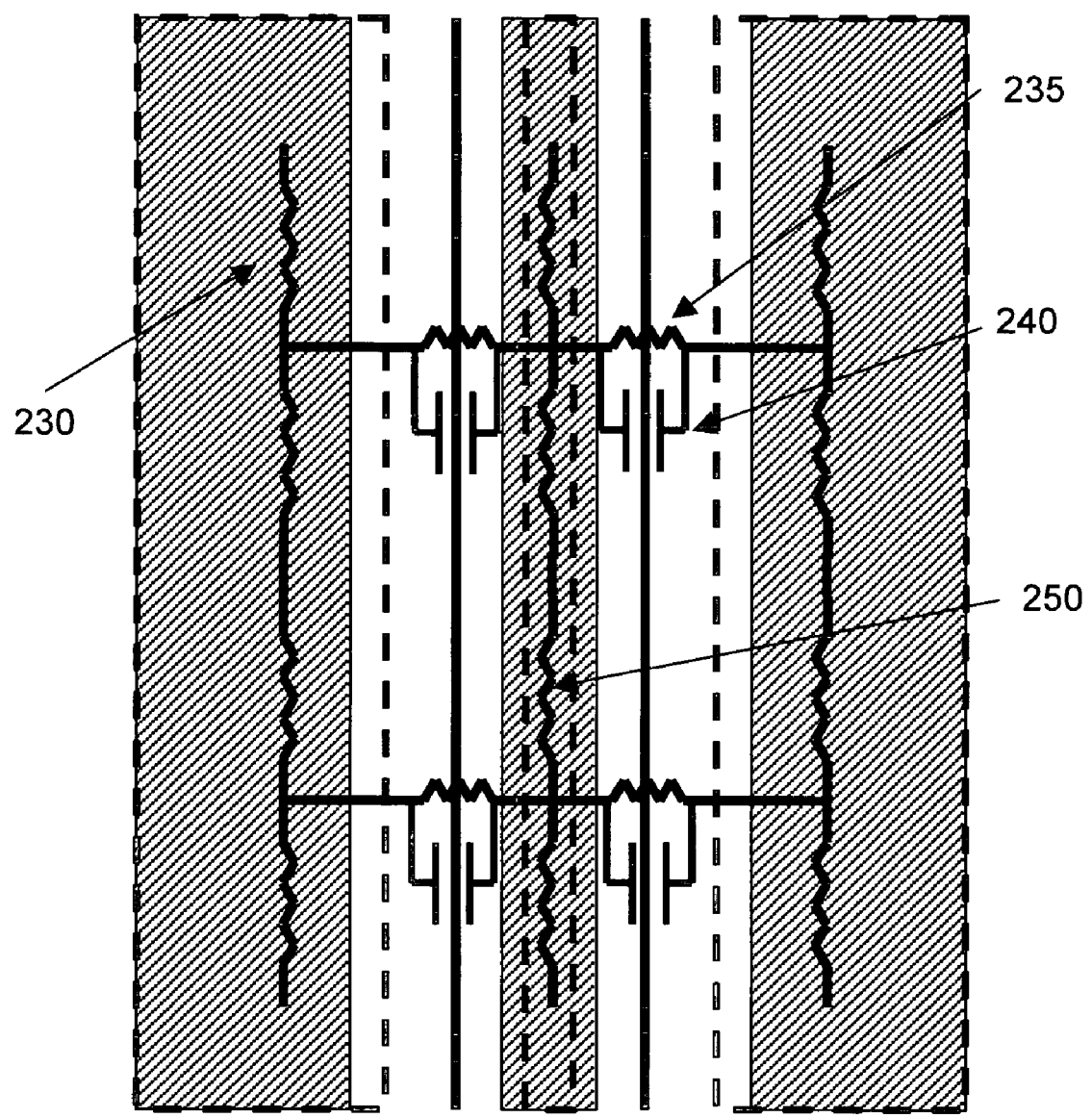
FIG. 3c is a plan view of the electro-optic device illustrating the equivalent electrical model of the electrode configuration.

In FIG. 3*c* is illustrated the equivalent RC circuit of the bias electrodes, consisting of the lumped elements representing the series resistance of the bias ground electrode 230, shunt resistance of the substrate 235, series resistance of the bias signal electrode 250 and the shunt capacitance 240.

Figure 4A:
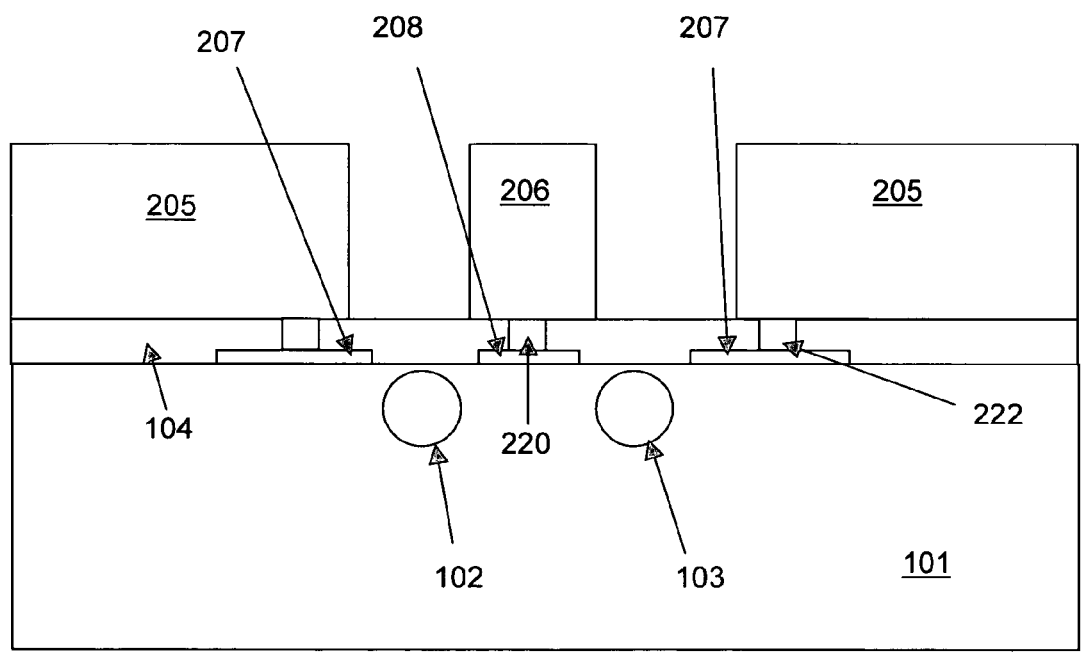
FIG. 4a is a cross-sectional view of the electro-optic device illustrating the location of vias for reducing series resistance effects.

In FIG. 4*a* showing the cross-section of a device, the bias electrodes 207 and 208 can be periodically connected to highly conducting electrodes with gold vias 222 and 220, e.g. to the RF electrodes 205 and 206. The small number of vias do not affect high frequency performance. This approach reduces the effective series resistance and the response time of the bias electrodes. The vias can be formed by etching the buffer layer. If the etchant attacks the bias electrodes, small thin rectangles of stop etch material, e.g. titanium-tungsten or other metal, can be deposited and patterned where the vias are located, prior to etching the buffer.

Figure 4B:
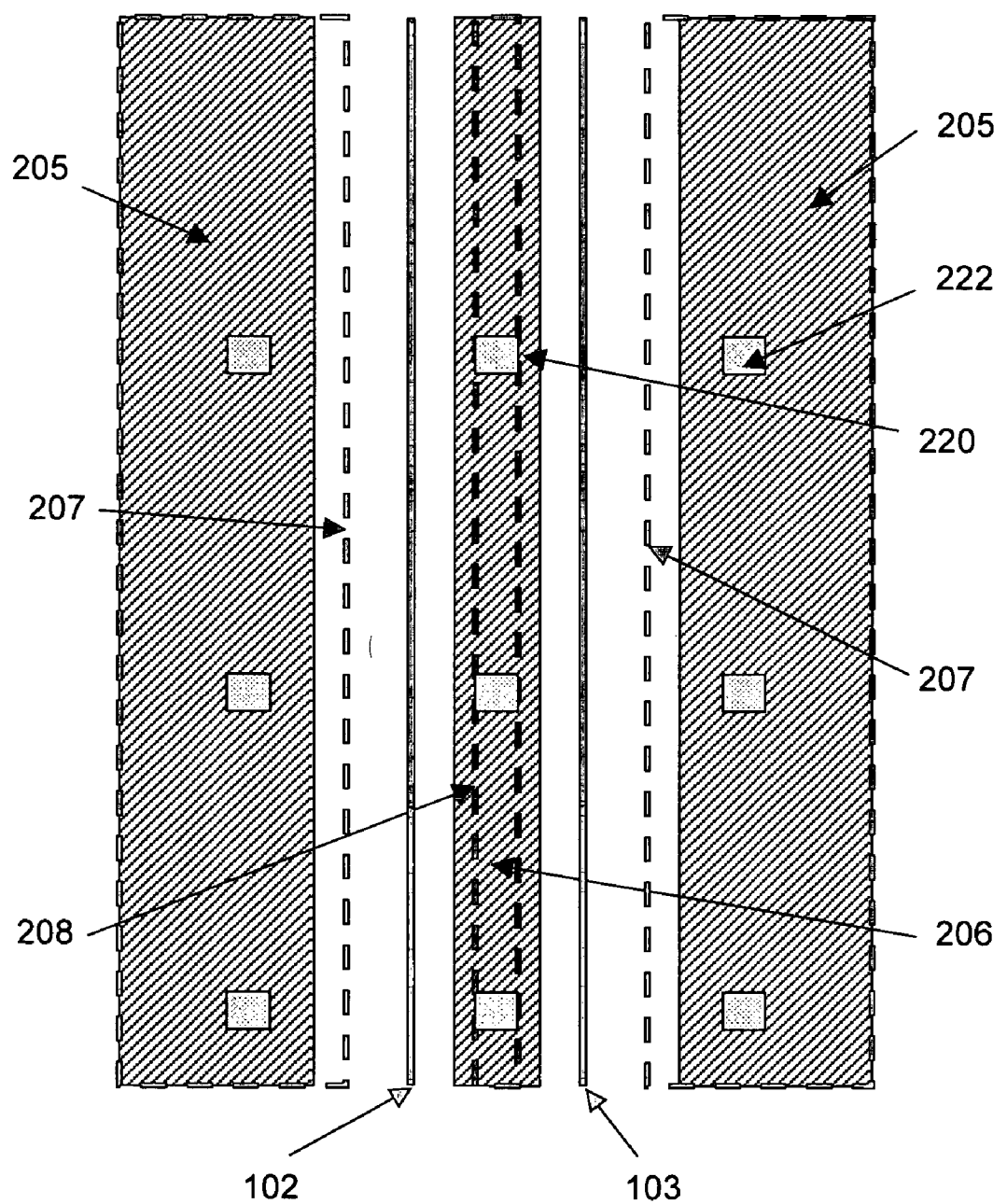
FIG. 4b is a plan view showing via positions.

FIG. 4*b* is a top view of the device in FIG. 4*a* illustrating the layout of the high resistivity signal and ground bias electrodes 208 and 207 connected to the highly conducting gold RF signal and ground electrodes 206 and 205 with gold vias 220 and 222 respectively. As the gold vias 220, 222 can be deposited into etched holes in the buffer layer, they can also act to improve the bonding of the gold electrodes to the device surface. This approach reduces the effective series resistance of the shadow electrodes relative to the shunt resistance of the substrate. The response time of the bias electrode needs to be fast enough to prevent bias voltage runaway from the buffer charging effect.

Figure 4C:
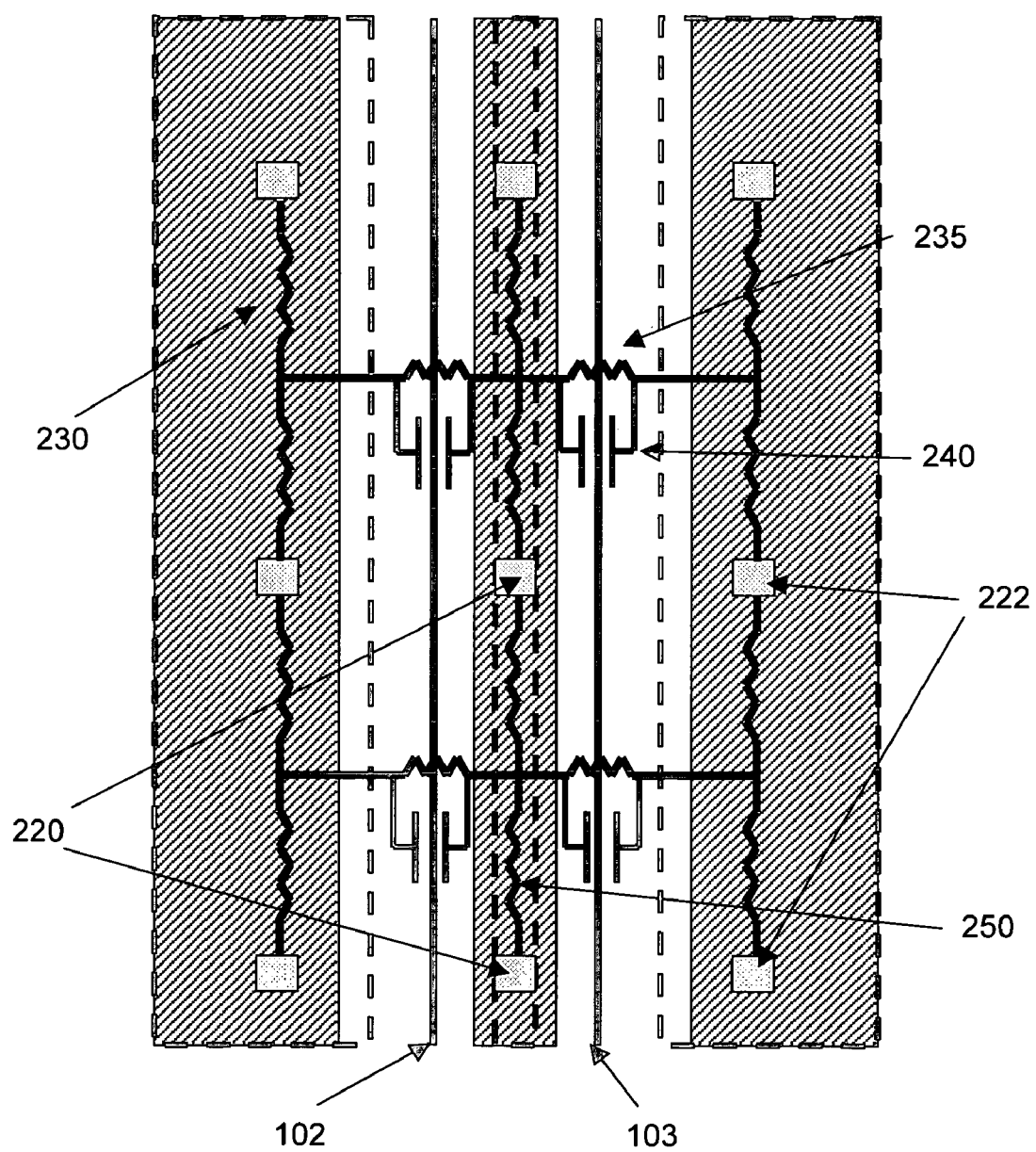
FIG. 4c is a plan view of an electro-optic device illustrating the equivalent electrical model of the electrode configuration with vias.

FIG. 4*c* illustrates the equivalent RC circuit of the bias electrodes, consisting of the lumped elements representing the series resistance of the bias ground electrode 230, shunt resistance of the substrate 235, series resistance of the bias signal electrode 250, the shunt capacitance 240 and the gold vias 220, 222.

A plurality of N vias reduces the effective series resistance by N. In addition, the shunt capacitance for each section is reduced by N. Shunt resistance increases by the same factor. The time constant is reduced by $N^2$. A time constant of an hour can be reduced to seconds. The loss of low frequency modulation efficiency due to the shunt resistance is also reduced. Typically, the vias are spaced 1 mm apart along the length of the device.

Figure 4D:
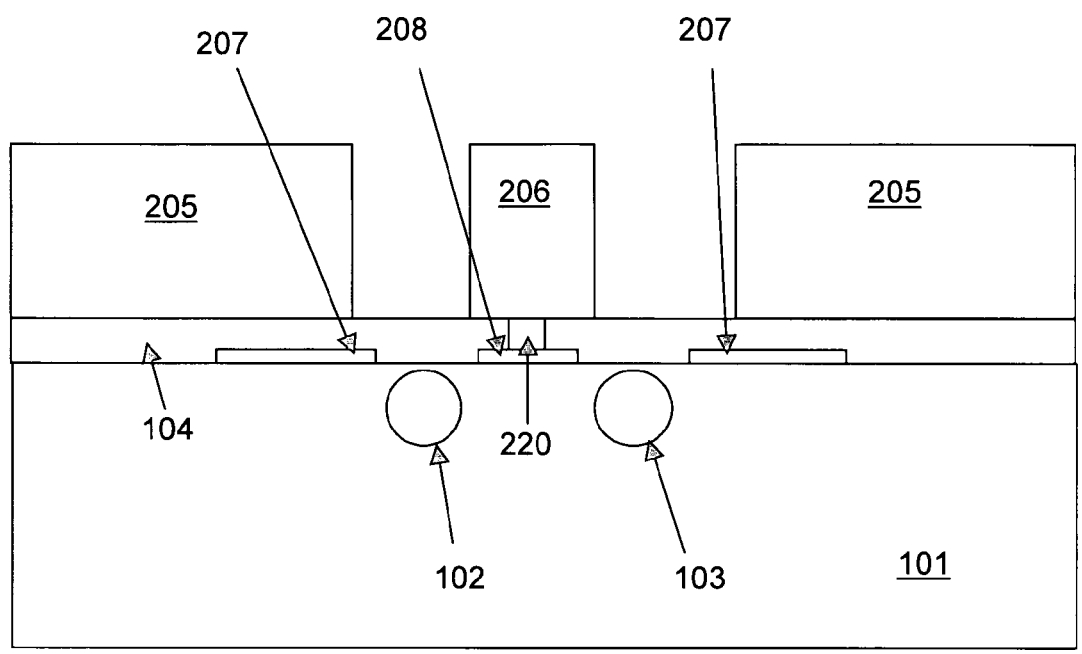
FIG. 4d is a cross-sectional view of an electro-optic device where the bias and RF signal electrodes are connected with vias through the buffer layer.

Another function for the gold vias can be to provide interconnections between the various electrodes in different configurations, depending on the intended application for the electro-optic device. FIG. 4*d* shows an embodiment in cross-section where the bias 208 and RF 206 signal electrodes are connected together by the gold via 220. In operation the DC potential of RF signal electrode 206, being connected directly to the RF ground electrode 205 through a 50 ohm load impedance is held close to zero. In this case, bias ground electrode 207 is electrically isolated from the RF ground electrodes 205, such that the bias signal is applied to these outer bias electrodes 207. In effect, the function of the bias signal and ground electrodes is interchanged. This topology eliminates the need for bias electrode material crossing the waveguides 102 and 103, which has been found to introduce some optical loss. Since both RF signal and ground electrodes 205, 206 are essentially at DC zero potential, any voltage-induced corrosion on the gold electrodes is eliminated. The width of the bias ground electrodes 207 (on the outside of the waveguides) is minimized to reduce the capacitance between the bias ground electrode 207 and the RF ground electrode 205. Any increase in capacitance for the bias ground electrode may further increase the response time for bias voltages applied to the bias ground electrodes 207, which is undesirable.

FIG. 4*e* shows the layout of the device in FIG. 4*d*, where the gold vias 220 connect the RF 206 and bias 208 signal electrodes. A thin metal conductor 226 in contact to the bias ground electrode 207 thereby reducing the series resistance to keep the time constant as short as possible. In addition, since the metal conductor is buried, it does not undergo significant voltage-induced corrosion, which requires a path for liquid to form between conductors having different DC potential. As the buried metal conductor 226 is placed away from the RF ground electrode 205, it does not affect the performance of the RF electrodes. Suitable material structures for the buried metal conductor are a thickness of 1000 to 3000 Angstrom of titanium-tungsten, titanium-tungsten with gold on top, chrome, or any other conductive metal. The buffer layer is patterned according to the outline 230 to permit an external connection of the buried metal conductor 226 to an external terminal 224.

Figure 5A:
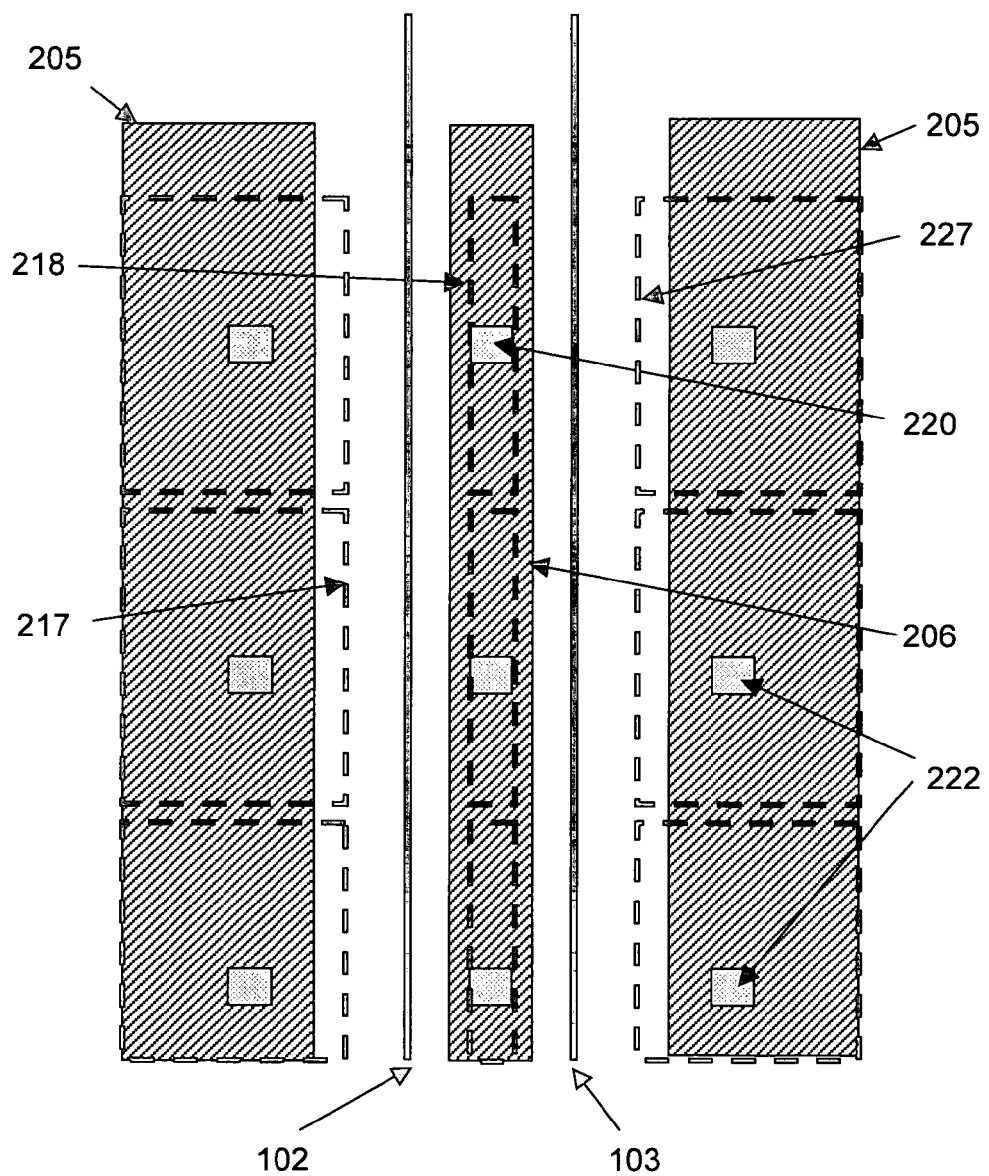
FIG. 5a is a plan view of an electro-optic device showing the electrode layout using vias to interconnect rectangular segments of the bias electrodes.

FIG. 5*a* shows bias ground and signal electrodes 217 and 218 respectively divided into segments to help suppress any propagation of RF signal along their length. The segments are connected to the RF ground and signal electrodes 205 and 206 by means of gold vias 222 and 220 respectively. Note that the bias electrodes need to carry only low frequency or DC voltages.

Figure 5B:
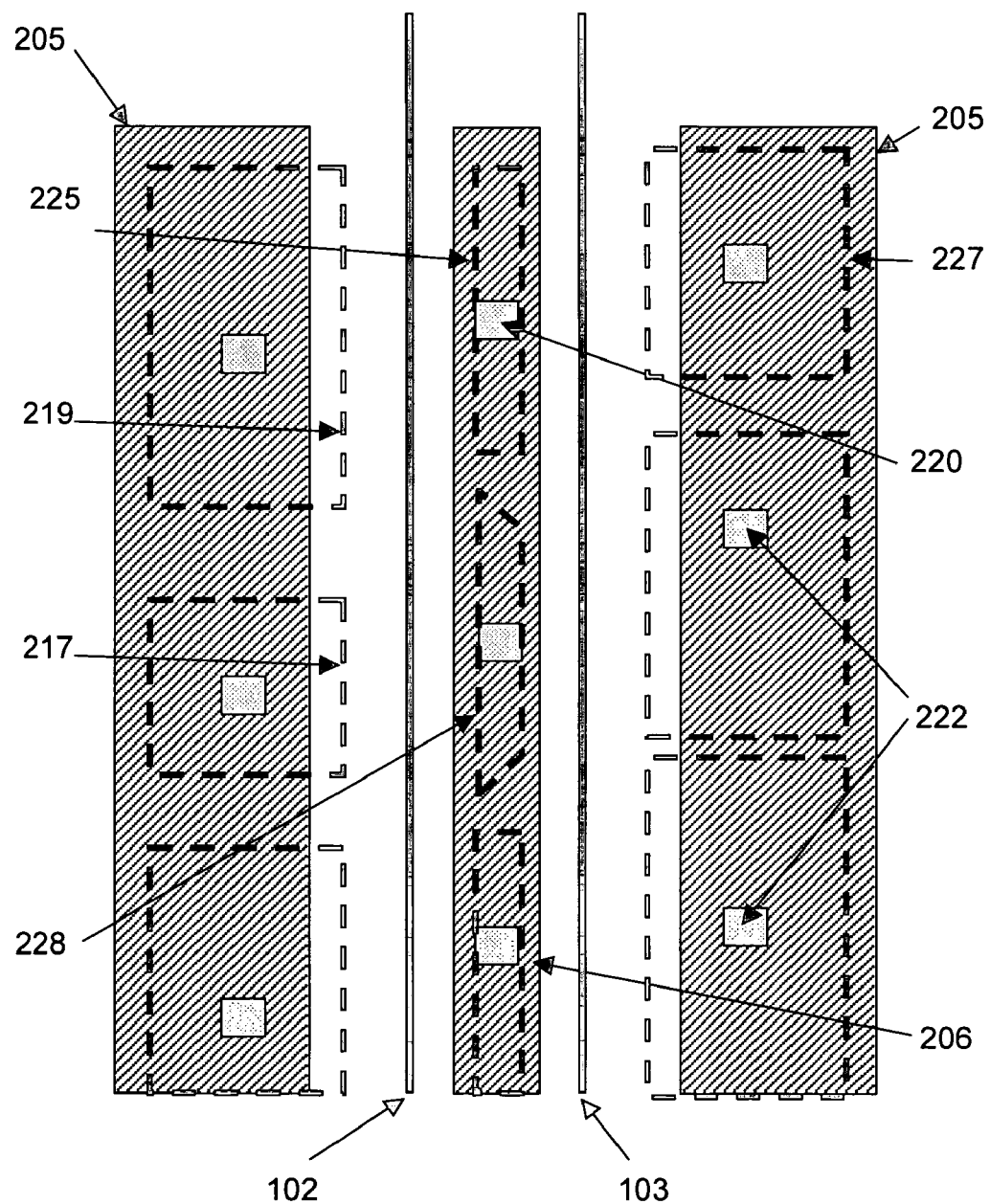
FIG. 5b is a plan view of an electro-optic device showing an electrode layout suitable for matching the modulation efficiency of bias & RF electrodes using bias electrode segments with different shapes, sizes and spacings.

An embodiment with the bias electrode segments with various shapes, sizes and spacings is shown in FIG. 5*b*. For instance, the bias signal electrode segment can be rectangular (225) or trapezoidal (228) to produce an asymmetric electric field in the waveguides 102, 103. Similarly the bias ground electrode can be rectangular (219) or square (217) depending on the electric field distribution required by the device design. The segments are connected to the RF ground and signal electrodes 205 and 206 by means of gold vias 222 and 220 respectively. The vias can provide additional adhesion of gold electrodes (for instance 205, 206) to the device surface.

Figure 6A:
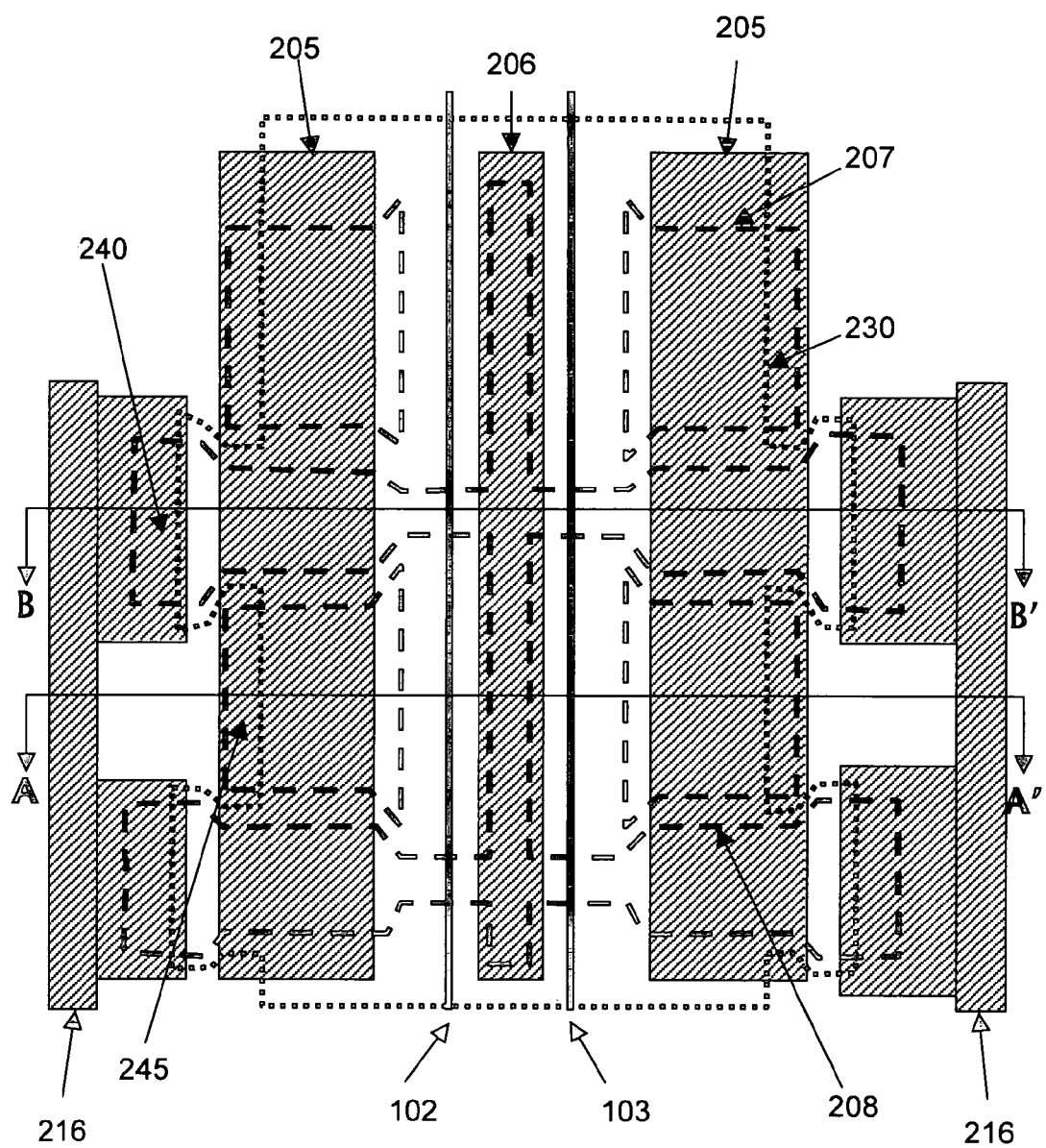
FIG. 6a is a plan view of an electro-optic device embodiment with segmented bias electrodes interconnected to a separate external contact.

In an embodiment such as the one shown in plan in FIG. 6*a*, the bias signal electrode 208 needs to be electrically separated from the RF signal electrodes 206, while the bias ground electrode segments 207 and RF ground electrode 205 remain connected at areas 245 where the buffer layer has been removed to expose the bias ground electrode. The buffer layer has been patterned accordingly with an outline 230.

The high resistivity bias signal electrode 208 is patterned so that sections of it can be extended between the bias ground electrode segments 207 in order to facilitate making contact with a highly conducting bias electrode 216 at areas 240 where the buffer layer has been removed. The bias signal electrode 208 is shown to cross over both waveguides 102, 103 at every point where it connects to highly conducting bias electrode 216. The number of crossings per waveguide is equal in order to maintain optical power balance and modulator extinction ratio in the waveguides 102, 103, as each crossing introduces a small amount of optical loss in the waveguide. Typically, there is a crossing every 1 mm of length along the electrode.

Alternatively, half of the crossings could connect only to the highly conducting electrode 216 on the right side of the drawing, whereas the other half of the crossings connect to the highly conducting electrode 216 on the left side of the drawing. In this alternate embodiment, optical power balance is maintained, while optical loss due to the crossings is cut in half.

Figure 6B:
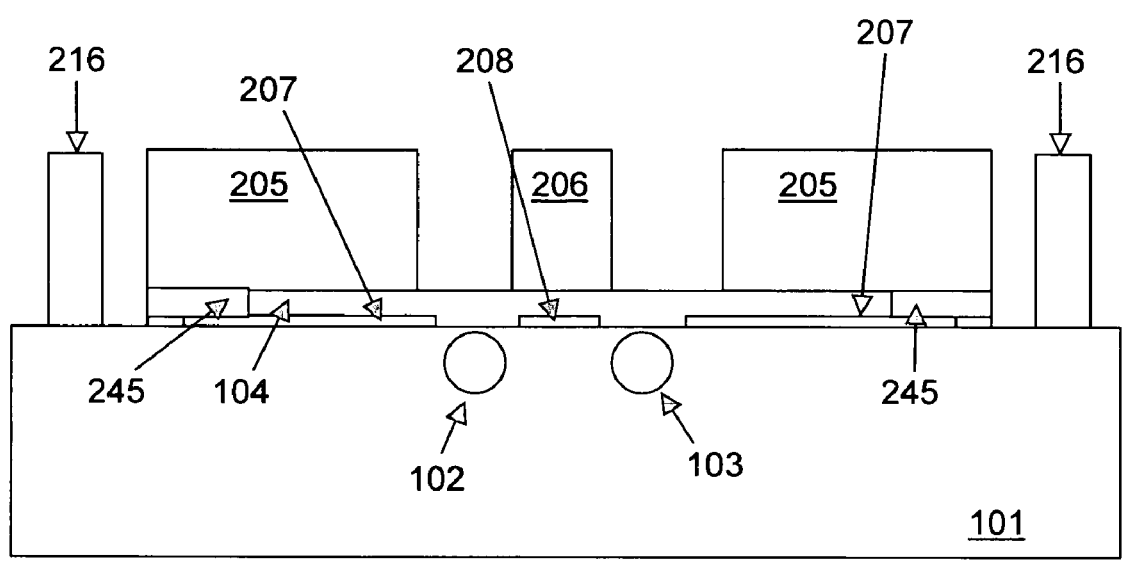

FIG. 6*b* shows the cross-section of the device in FIG. 6*a* along the section A-A'. The bias ground electrode segments 207 and RF ground electrode 205 remain connected at areas 245 where the buffer layer 104 has been removed to expose the bias ground electrode segments 207.

Figure 6C:
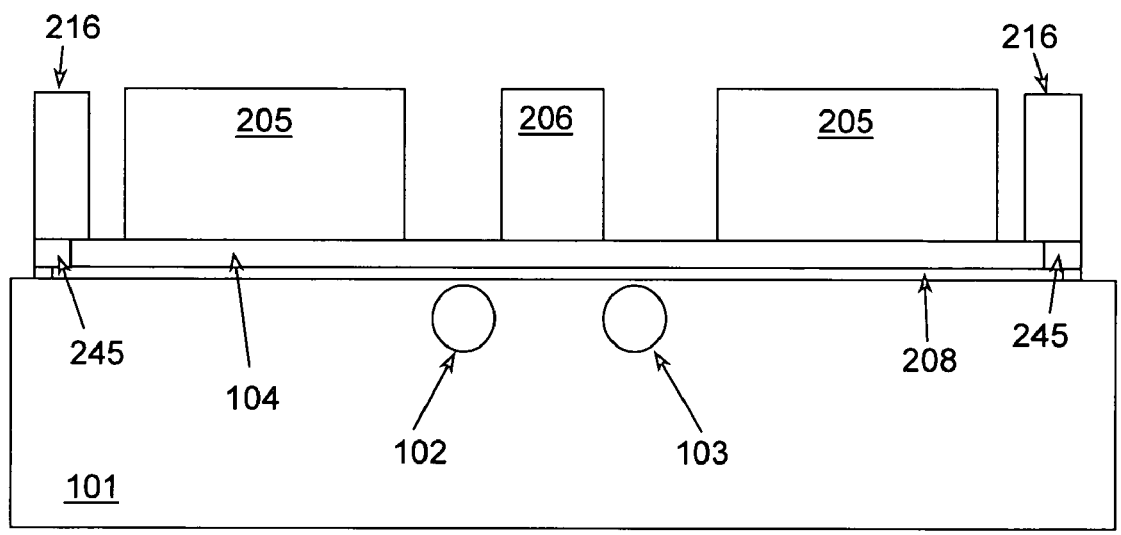

FIG. 6*c* shows the cross-section of the device in FIG. 6*a* along the section B-B'. The high resistivity bias signal electrode 208 is extended under the RF signal and ground electrodes 206 and 205 respectively, over the optical waveguides 102 and 103, to make contact with a highly conducting bias electrode 216 at areas 245 where the buffer layer 104 has been removed.

Figure 7A:
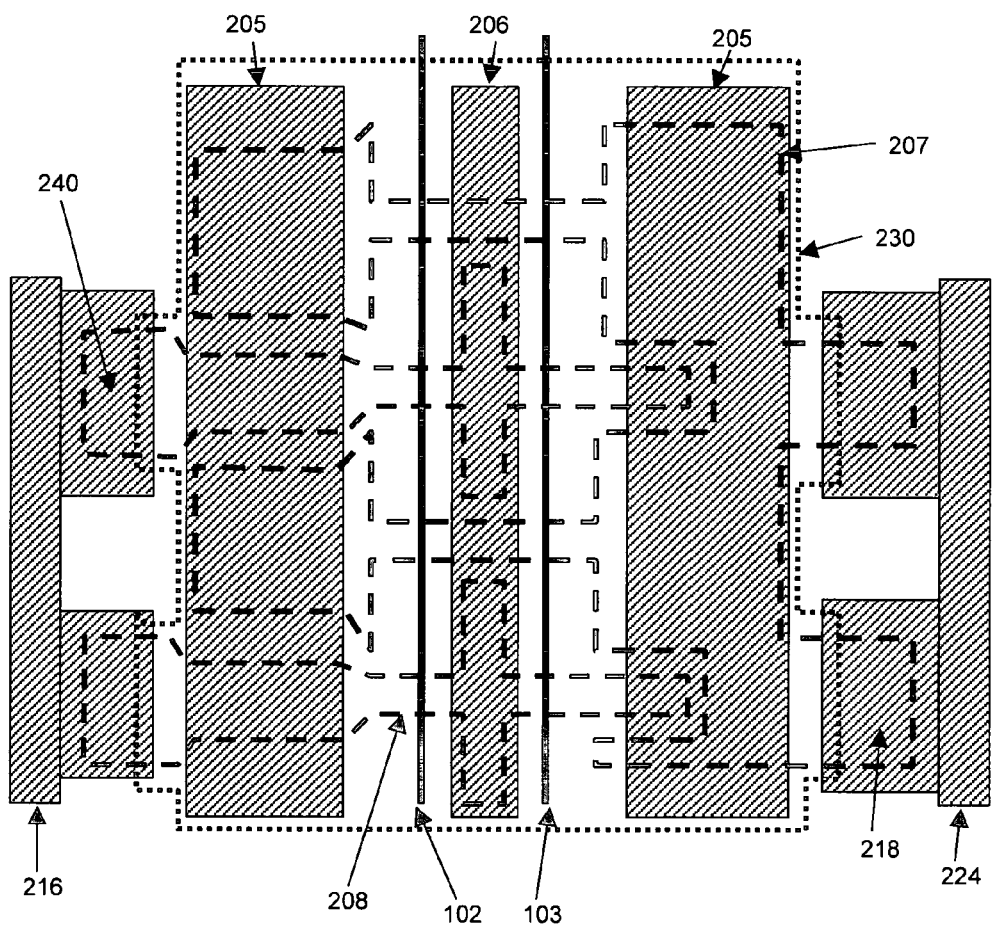
FIG. 7a is a plan view of an electro-optic device showing another embodiment with segmented bias electrodes interconnected to a separate external contact.

In another embodiment such as the one shown in plan in FIG. 7*a*, both the bias signal and ground electrodes (208 and 207 respectively) need to be electrically separated from the RF signal and ground electrodes (206 and 205 respectively). For this purpose, the high resistivity bias signal and ground electrodes (208 and 207 respectively) are segmented and the buffer layer patterned to an outline 230. The high resistivity bias signal electrode is extended to one side to make contact with the highly conducting gold bias signal electrode 216 at areas 240 where the buffer layer has been removed. The high resistivity bias ground electrode is extended to the other side to make contact with the highly conducting gold bias ground electrode 224 at areas 218 where the buffer layer has also been removed.

Figure 7B:
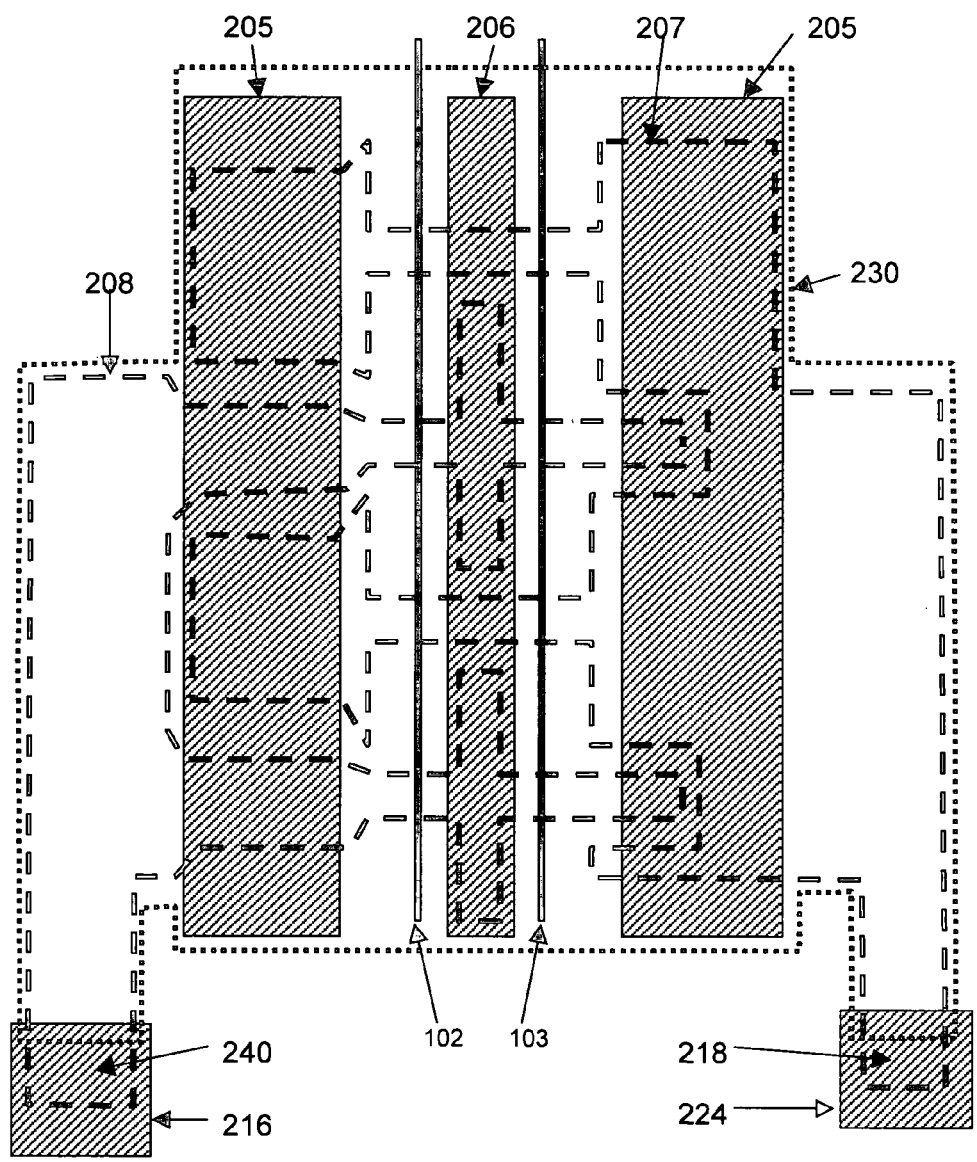
FIG. 7b is a plan view of an alternative electro-optic device embodiment with segmented bias electrodes interconnected to a separate external contact.

An alternative topology to that in FIG. 7*a* is shown in FIG. 7*b*. The description is identical, except that the highly conducting gold electrodes 216 and 224 do not run parallel to the RF ground electrodes as in FIG. 7*a*, but are brought out as contact pads at one point on the device. A second alternative topology is to cover the long traces of bias signal and ground electrode that are outside of the RF ground electrodes with a thin metal layer, thereby reducing the series resistance of those traces. Those long traces would still be covered by buffer layer, preventing or suppressing any corrosion due to humidity.

Figure 8A:
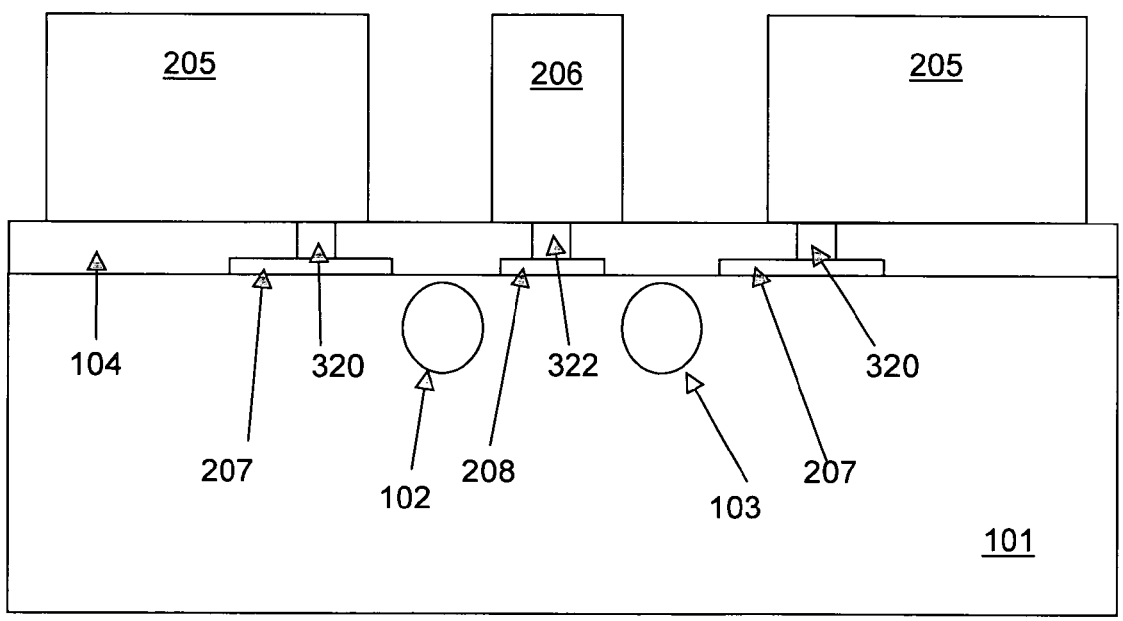
FIG. 8a is a cross-sectional view of an embodiment of an electro-optic device illustrating ion implanted vias for connecting to the bias electrodes.

The gold vias described in FIG. 4 can be fabricated in an alternative way to achieve an electrical contact between the bias and RF electrodes, as shown in FIG. 8. In this embodiment, the conductivity of the buffer layer 104 is increased by ion implanting suitable dopants over its total thickness. Thus the RF ground electrode 205 can now make contact with the high resistivity bias ground electrode 207 through the ion-implanted via 320. Similarly the RF signal electrode 206 can now make contact with the high resistivity bias signal electrode 208 through the ion-implanted via 322.

Figure 8B:
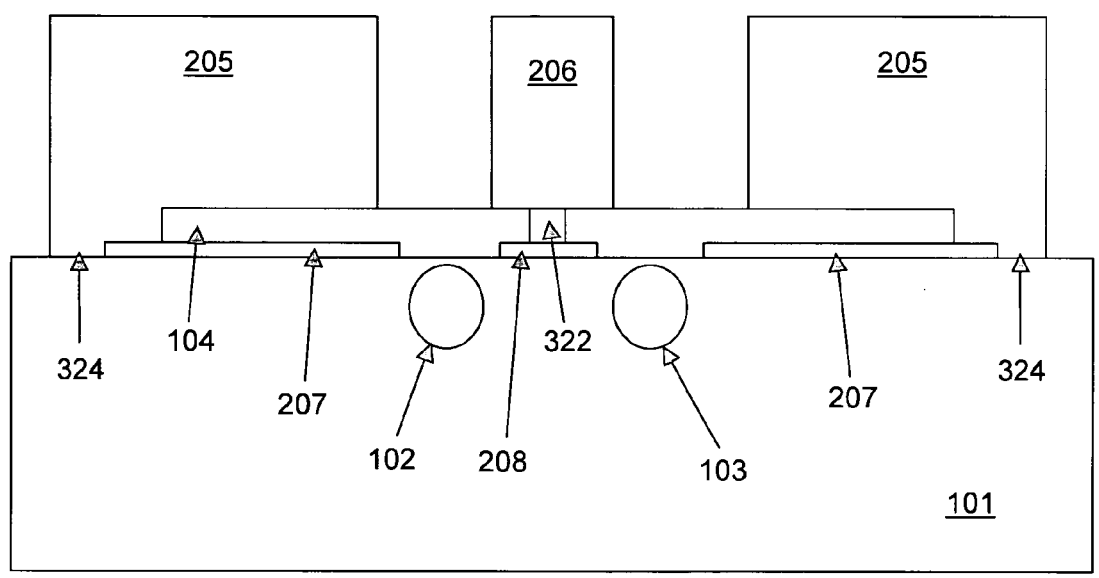
FIG. 8b is an alternative embodiment of FIG. 8a which uses a combination of implanted vias and gold connections at the electrode periphery.

FIG. 8*b* shows an alternative embodiment where the RF ground electrode 205 makes contact with the high resistivity bias ground electrode at the edge 324 where the buffer layer 104 has been removed.

Figure 9A:
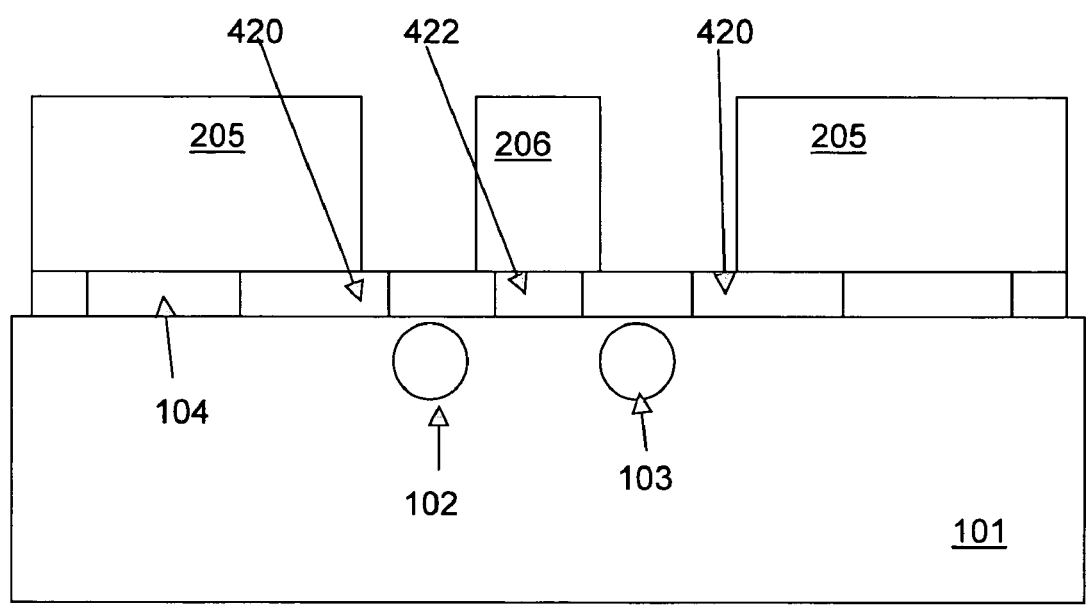
FIG. 9a is a cross-sectional view of another embodiment of an electro-optic device illustrating ion implanted bias electrodes which also form vias.

Furthermore, as shown in FIG. 9*a*, the lateral extent of the ion implanted conducting vias in the buffer layer 104 need not be confined to a fraction of the high resistivity bias electrode area, but can extend to the limits of the bias signal and ground electrodes respectively. In effect, the via and electrode merge to form a single entity. The RF ground electrode 205 can now make direct contact with the ion-implanted bias ground electrode 420, while the RF signal electrode 206 can now make direct contact with the ion-implanted bias signal electrode 422.

Figure 9B:
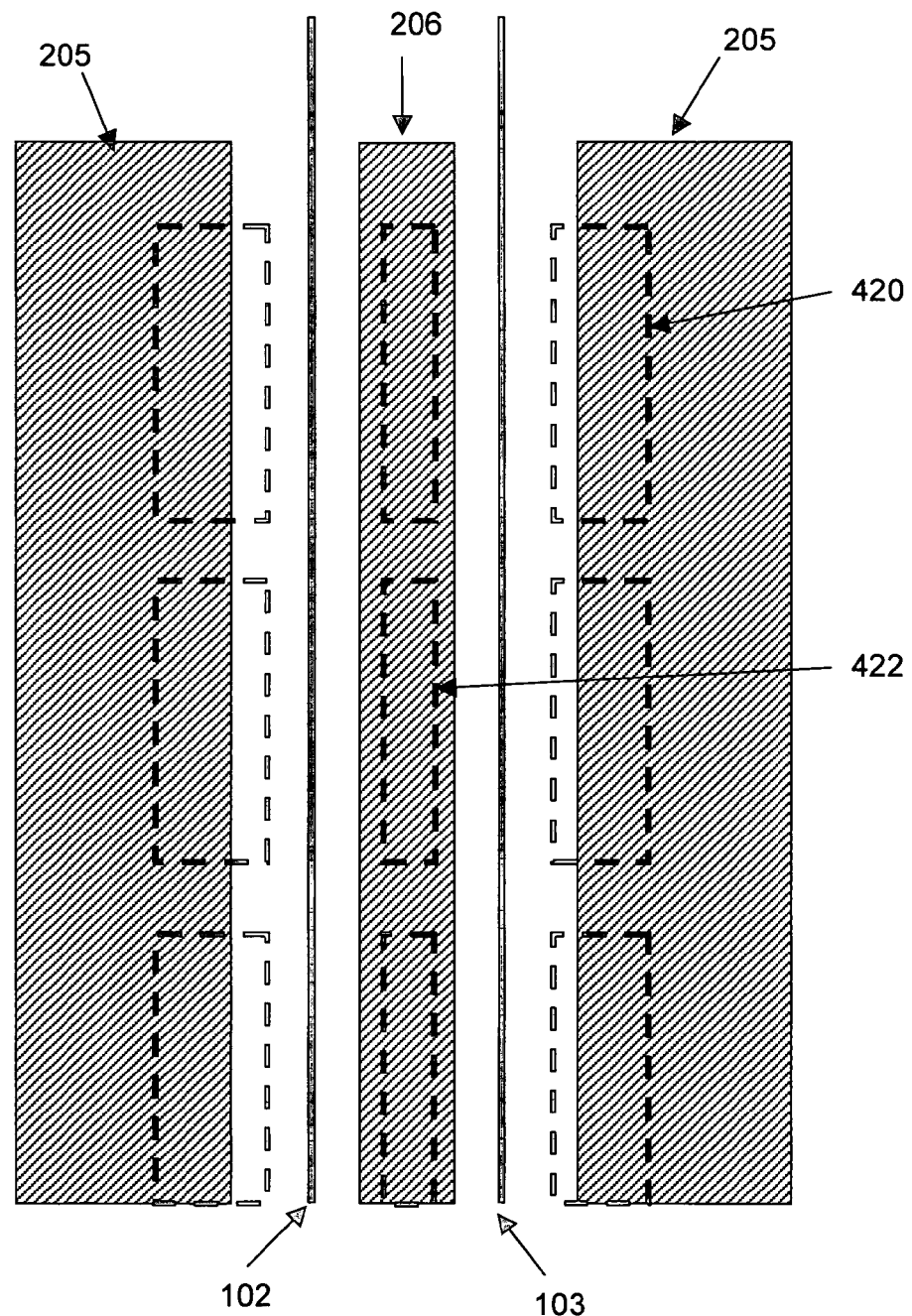

FIG. 9*b* shows the layout of a device corresponding to the cross-section in FIG. 9*a*. The ion-implanted segmented bias signal and ground electrodes (422 and 420 respectively) can be segmented as with other fabrication processes to prevent RF signals from propagating within the ion-implanted region.

Figure 10A:
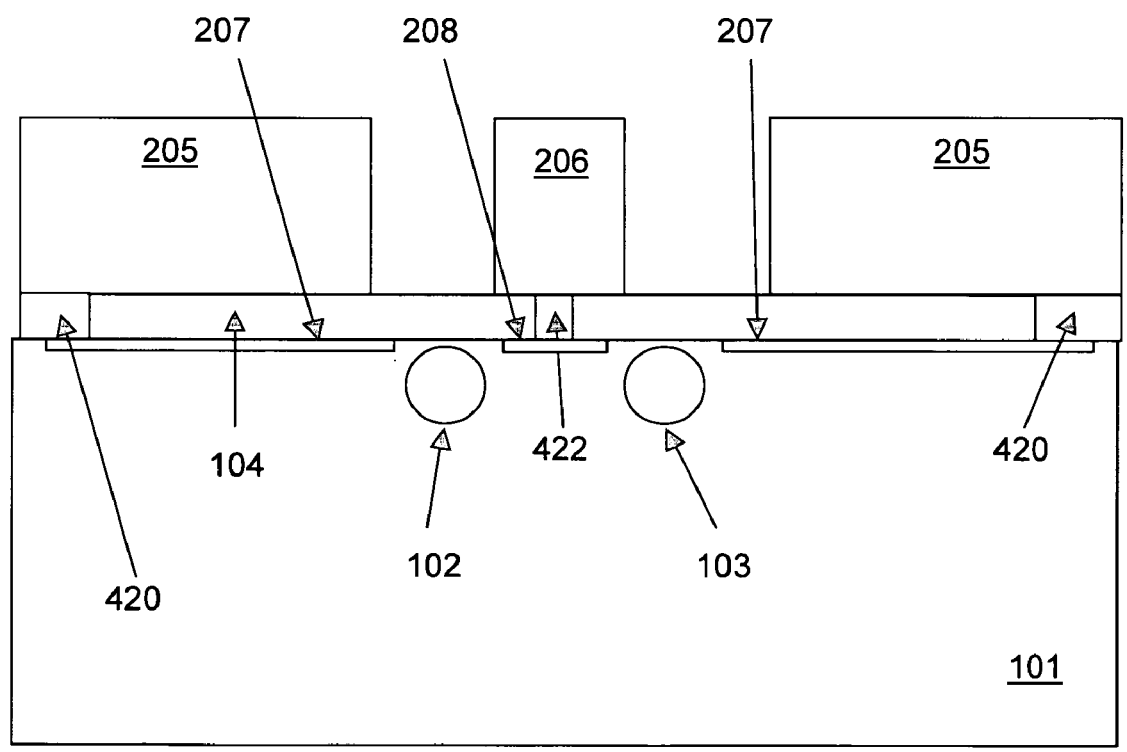
FIG. 10a is a cross-sectional view of an embodiment of an electro-optic device where the bias electrodes are ion implanted into the substrate.

FIG. 10*a* shows a cross-section of an embodiment where the bias electrodes are formed by etching trenches in the substrate 101, and partially or fully filling the trench with the high resistivity material for the bias electrodes. Conducting vias 422 can connect the buried bias signal electrode 208 with the RF signal electrode 206. Vias 420 can also connect the bias ground electrode 207 to the RF ground electrode 205, where the connection can be made at the periphery of the electrode, as shown. The buried bias electrodes have a higher modulation efficiency than those on the surface, thereby reducing the required bias voltage.

An alternative to etching trenches in the substrate and backfilling with high resistivity material for the bias electrodes is the use of ion implantation into the substrate with a suitable material to increase its electrical conductivity.

Figure 10B:
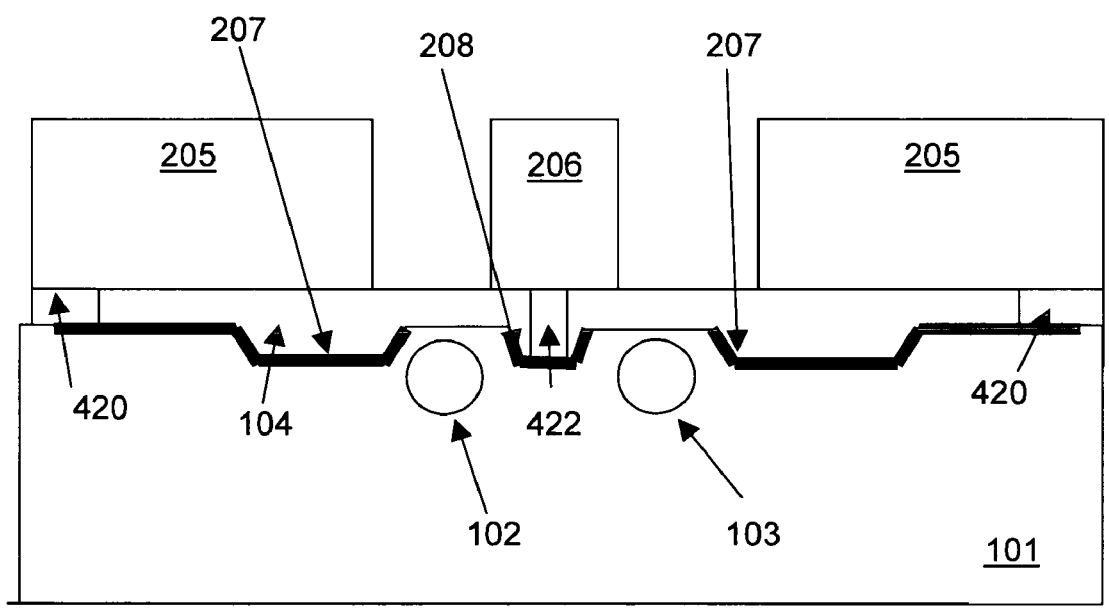
FIG. 10b is a cross-sectional view of another embodiment of an electro-optic device where the bias electrodes are ion implanted into trenches in the substrate.

FIG. 10*b* illustrates a variation of the device in FIG. 10*a*. In this embodiment, the trenches in the substrate 101 are deeper, and the bias electrodes 207, 208 conform to the surface of the trenches. The bias electrodes 207, 208 only partially fill the trench, with the buffer material filling the remainder of the space within the trench. The gold via 422 connects the buried bias signal electrode 208 to the RF signal electrode 206. The buried bias electrodes can also be used in other embodiments, where the RF signal electrode is DC isolated from the bias signal electrode.

Figure 11A:
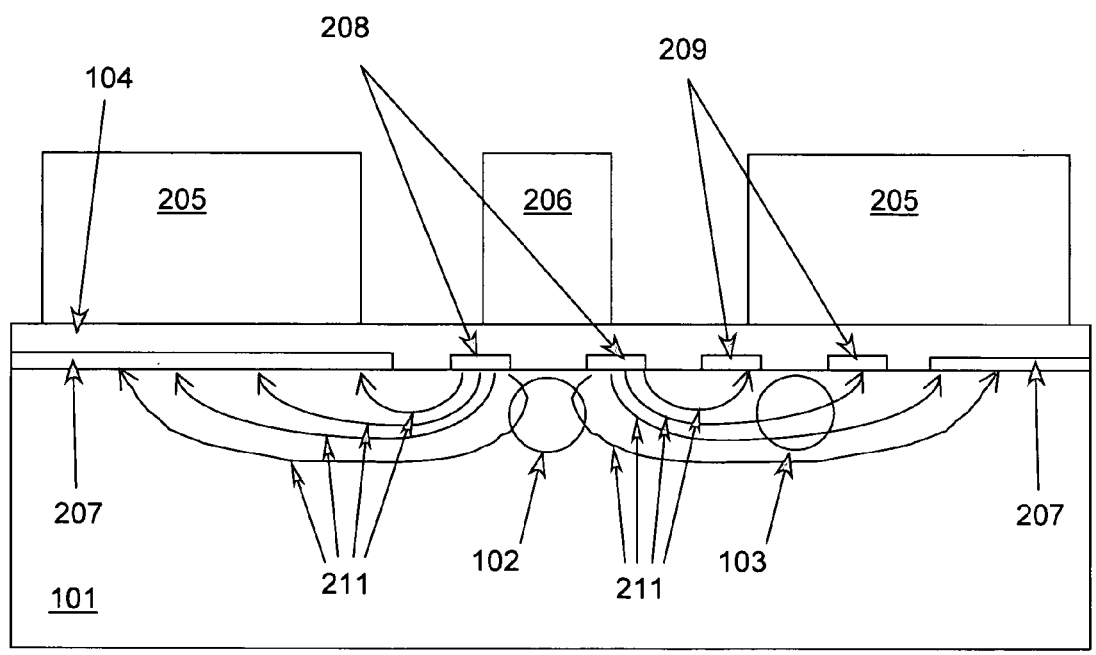
FIG. 11a is a cross-sectional view of an embodiment of a Z-cut electro-optic device showing the electric field generated when a voltage is applied to the split bias signal electrode on the left.

For Z-cut embodiments, of which an example is shown in FIG. 11a, the bias electrodes must be positioned above the optical waveguides 102, 103 to achieve the required electric field configuration. However resistive bias electrode material directly on the waveguide results in optical loss of about 1 to 2 dB/mm of electrode, or 30 to 60 dB for a 30 mm electrode. Because this amount of optical loss in the optical waveguide would be excessive, the bias signal electrodes 208, 209 are split along an axis parallel to the waveguides 102, 103 into two part-electrodes at equal voltage potential. There will be a trade-off between optical loss and bias electrode modulation efficiency (or $V_{pi}$), as the required bias drive voltage will increase as the gap in the split electrode is increased. Optical loss will of course decrease as the gap in the split electrode increases.

When bias voltage is applied to one of the split bias signal electrodes 208 while maintaining the second split electrode 209 at zero potential, the electric field lines 211 result. They are similar to what would be produced by a single electrode of the same width. The separation between the two part-electrodes depends on material parameters and the optical waveguide design, but typically lies in the range 10-14 micron (μm). It should be noted that in the first waveguide 102 the field is approximately vertical, while in the second waveguide 103 the field is approximately horizontal.

For the z-cut lithium niobate embodiments, if the split electrodes adjacent to the two waveguides are DC electrically isolated from the bias ground electrodes, a differential drive circuit can be used to drive the bias electrode. For example, if only one of the split electrodes is isolated and the other split electrode is grounded, and if $V_{pi}$=6V, a bias voltage of anywhere from −6V to +6V is required to set the interferometer bias point. With a differential drive a separate voltage is applied to each of the split electrodes, cutting the voltage in half to −3V to +3V. For example, +3V is applied to one split electrode, while −3V is applied to the other split electrode. Hence, the number of required voltages is doubled, but the range of required voltage is halved. Note that the ground bias electrodes are still required, as they help to focus the applied DC bias field through each waveguide. Removing the bias ground electrodes will decrease modulation efficiency, thereby increasing the $V_{pi}$ of the bias electrode.

Thus it is advantageous to have two signal electrodes in order to enable the RF and bias signals to be applied differentially to each signal electrode, either one at a time or with opposite polarities. In this way the required absolute signal voltage is halved, which can simplify the controller circuitry and power supplies.

Figure 11B:
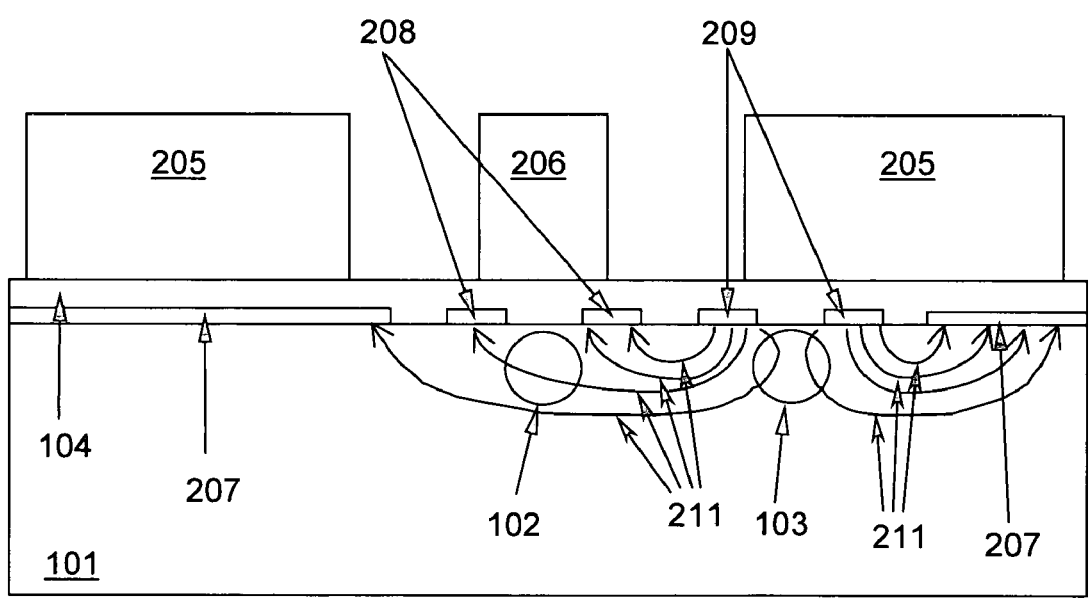
FIG. 11c is similar to the embodiment in FIG. 11a but with a bleed layer located on top of the buffer.
FIG. 11d is similar to the embodiment in FIG. 11b but with a bleed layer located on top of the buffer.

FIG. 11b shows the same device as in 11a with bias voltage applied to the second electrode 209 while maintaining the first electrode 208 at zero potential. The electric field configuration described by field lines 211 has been interchanged.

Figure 11C:
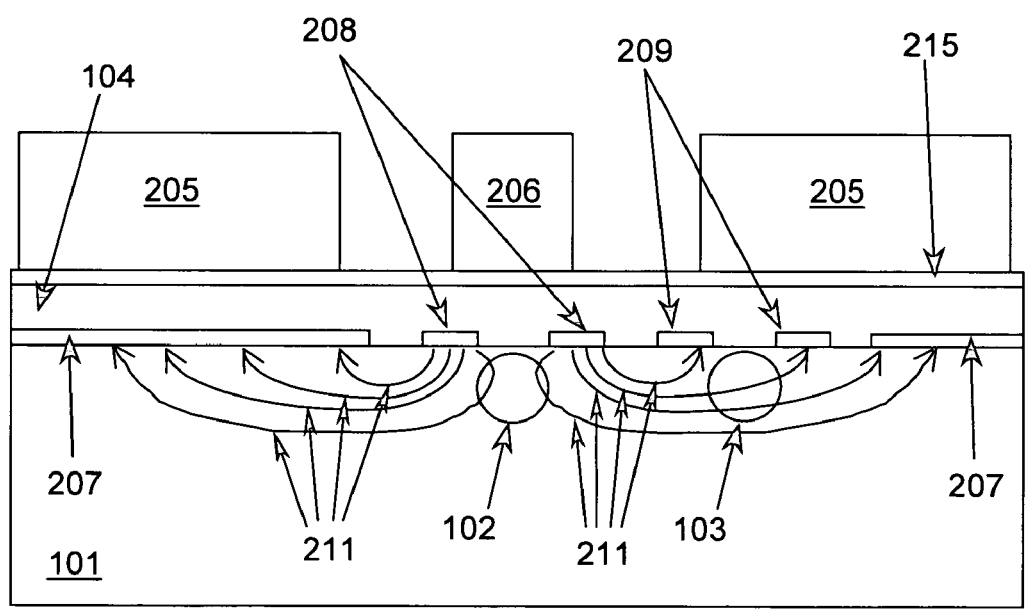
Figure 11D:
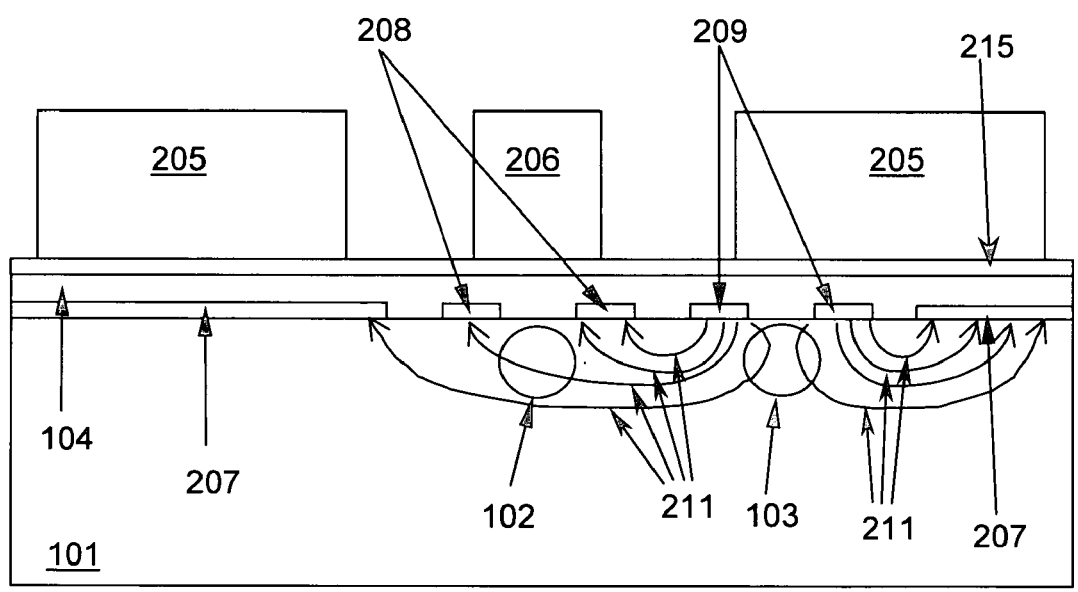

For both of the embodiments described in FIG. 11a and 11b, an additional high resistivity bleed layer 215 shown in FIGS. 11c and 11d respectively can be incorporated in the device structure.

Figure 12A:
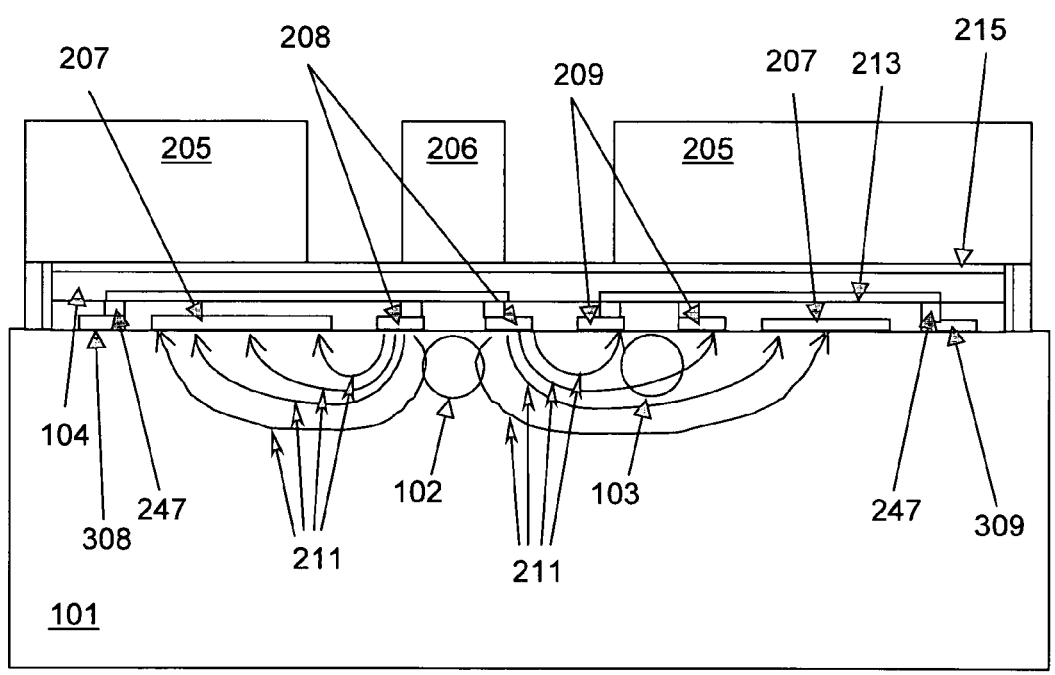
FIG. 12a is similar to the embodiment in FIG. 11c but with an interconnect electrode layer located within the buffer layer.

An embodiment for connecting the bias signals to the bias signals described in FIG. 11 is shown in FIG. 12a. High resistivity vias 247 periodically connect the bias signal electrodes 208, 209 to a high resistivity intermediate layer 213, which is connected to a wider bias signal electrode 308, 309 on the opposite side of the bias ground electrodes 207. The wider signal electrode reduces the series resistance introduced by long lengths of narrow split electrodes 208, 209. The high resistivity layer 215 may encapsulate the buffer layer 104 at the sides for improved reliability in the presence of humidity.

Figure 12B:
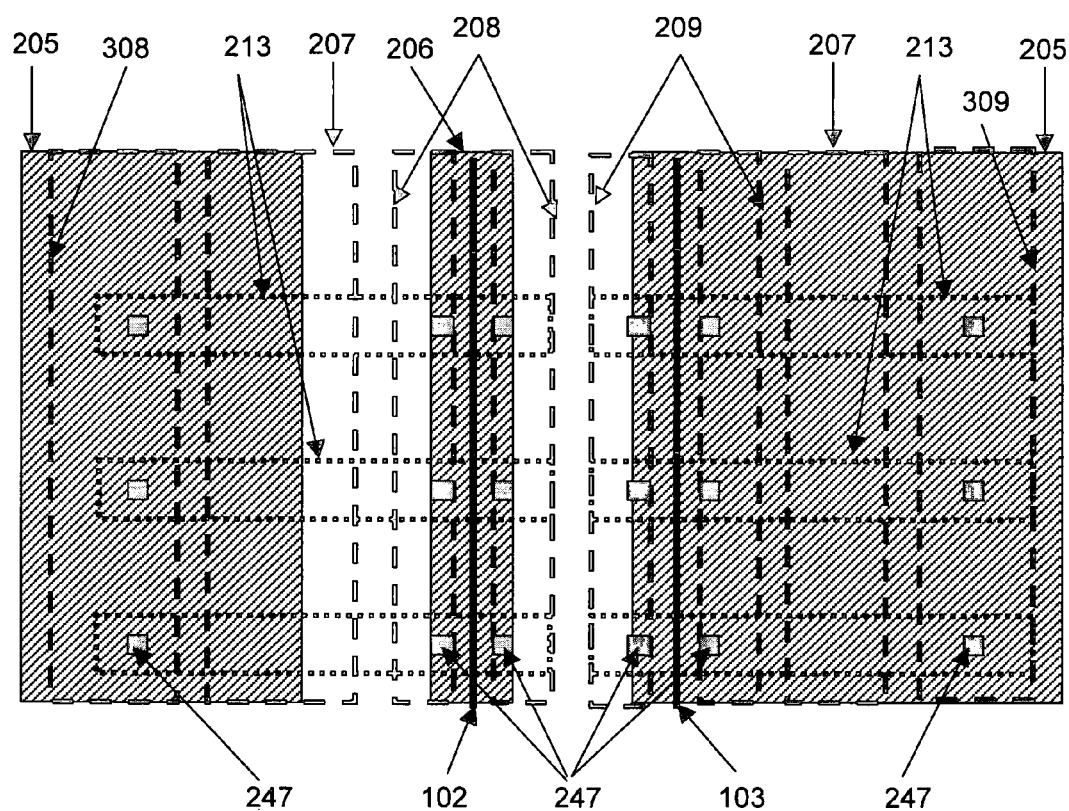
FIG. 12b shows the layout of the interconnecting electrodes in plan view.

The layout of this embodiment is shown in FIG. 12b, where the numbering has the same meaning as in FIG. 12a.

Figure 13A:
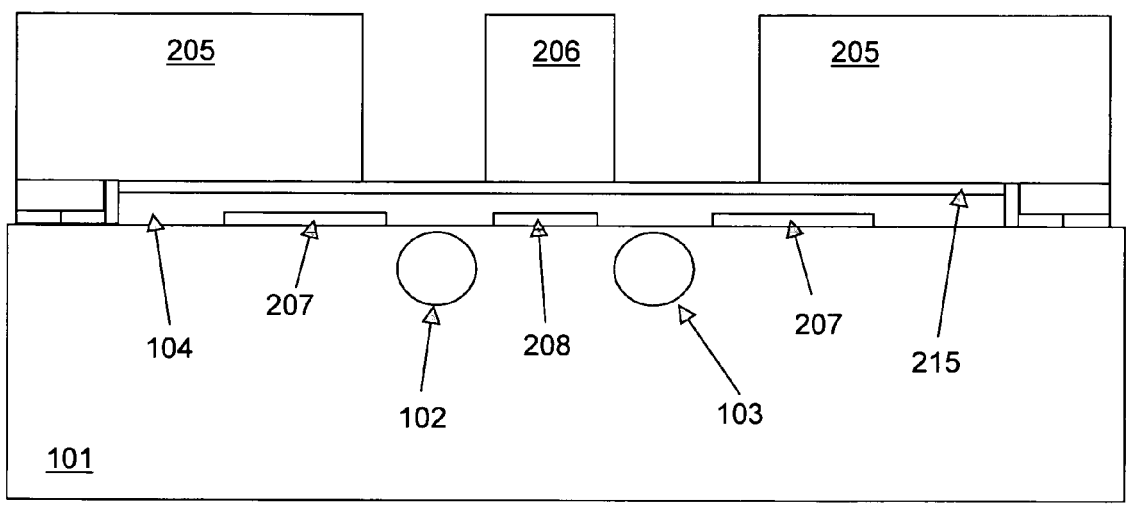
FIG. 13a is similar to the embodiment in FIG. 3a but incorporating an additional high-resistivity encapsulating layer on the surface of the buffer layer.

FIG. 13a shows an embodiment where a high resistive layer 215 is added on top of the buffer 104 to act as a moisture barrier, preventing voltage induced ion migration and corrosion in humid environment, as, for instance, in a non-hermetic package. Long term optical phase is determined by conduction current through substrate. Since buffer layer 104 conductivity is much lower than the substrate 101, conduction currents are unaffected by the high resistive encapsulating layer 215 on top of buffer layer 104. Field lines from high speed signal are unaffected by either high resistive electrodes 207, 208 or high resistive layer 215 on top of the buffer layer 104. DC bias control voltage is applied only to the bias electrodes 207, 208.

Figure 13B:
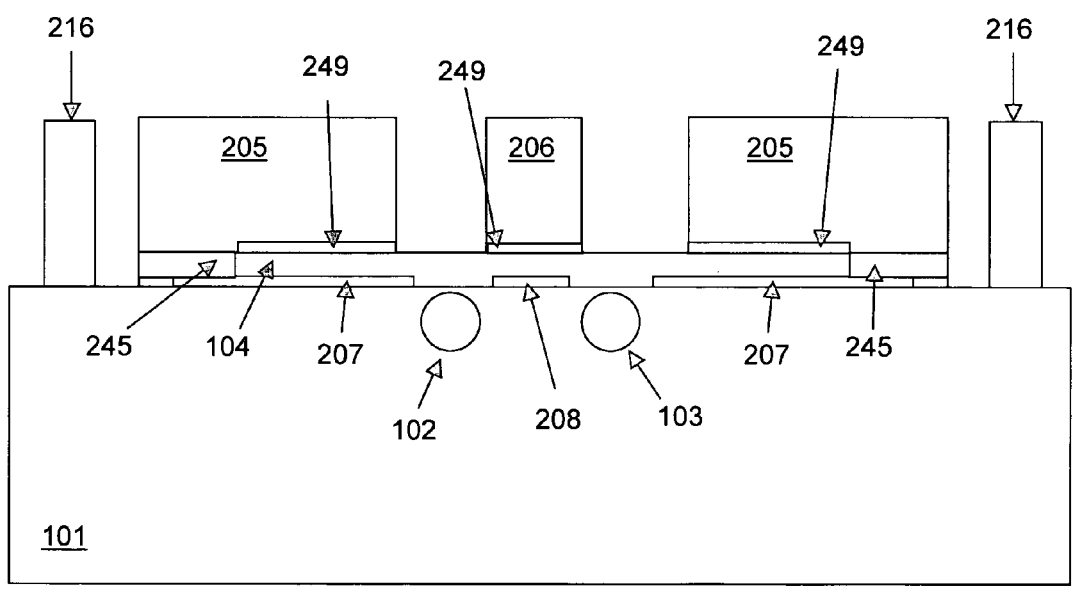
FIG. 13b is similar to the embodiment in FIG. 6b but with interfacing metallisation under the gold RF electrodes to improve electrode adhesion.

FIG. 13b shows a cross-section of a bias signal electrode 208 that is DC isolated from the gold RF signal electrode 206 (similar to FIG. 6a). The adhesion layer 249 underneath the gold RF ground and signal electrodes 205 and 206 is made of a thin layer of nickel. The gold-nickel RF electrode may suffer less from galvanic corrosion due to a smaller difference between the work functions of the two metals. In addition, the DC bias voltages appear only across the bias electrodes, eliminating voltage-enhanced corrosion of the gold electrodes. Hence, both corrosion mechanisms are eliminated, enabling low cost non-hermetic packaging of the modulator.

Figure 14A:
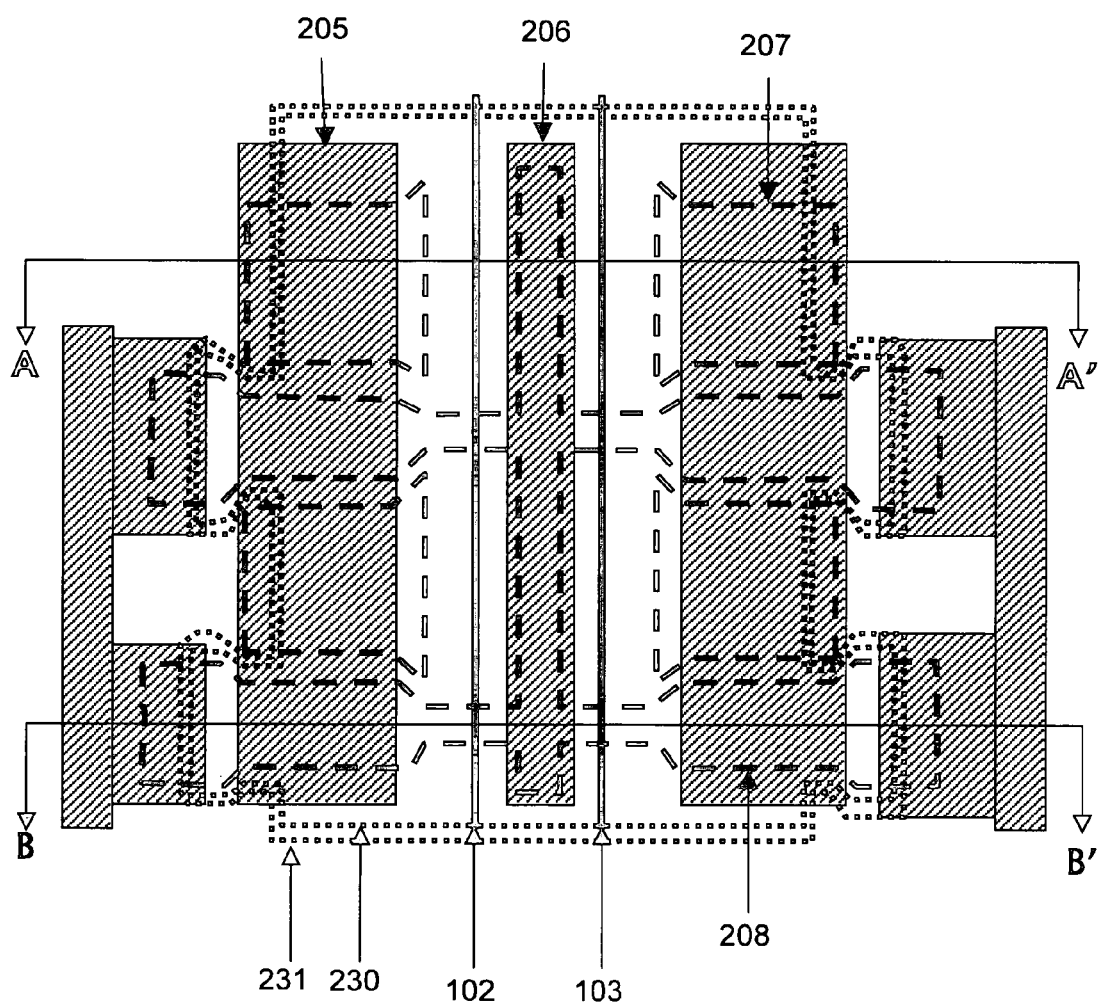
FIG. 14a show the layout of an embodiment of an electro-optic device incorporating a high-resistivity encapsulating layer on the surface of the buffer layer.

FIG. 14a is the layout of an embodiment with an encapsulating layer on top of the buffer layer for greater immunity to the effects of a humid environment. The encapsulating layer with outline 231 could be made of the bias electrode material or some other. No voltage potential is carried by the encapsulating layer.

Figure 14B:
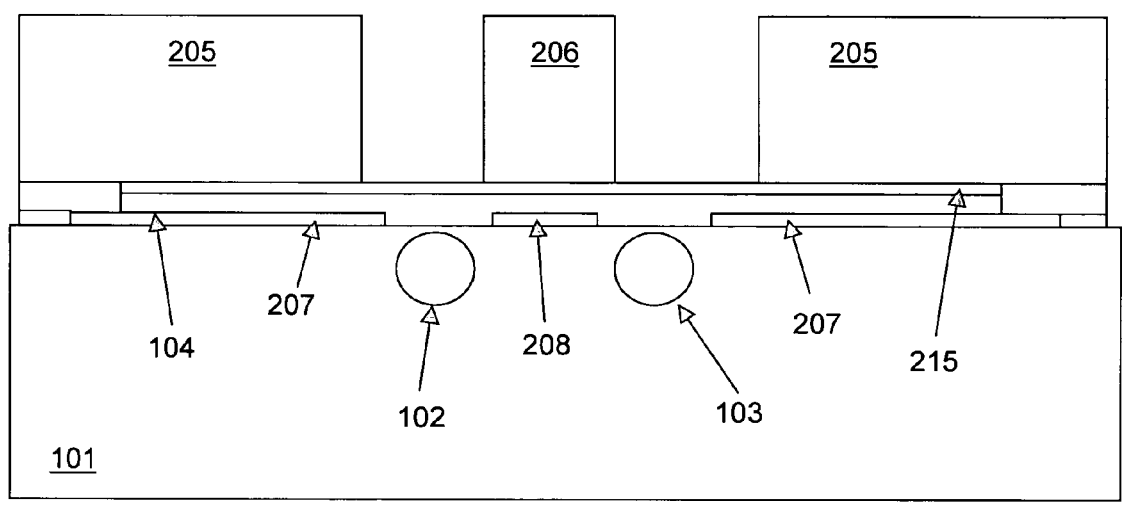
FIG. 14b is a cross-sectional view of the embodiment in FIG. 14a along A-A'.

FIG. 14b shows the cross-section along the section A-A' of the device in FIG. 14a with an encapsulating layer 215 on top of the buffer layer 104.

Figure 14C:
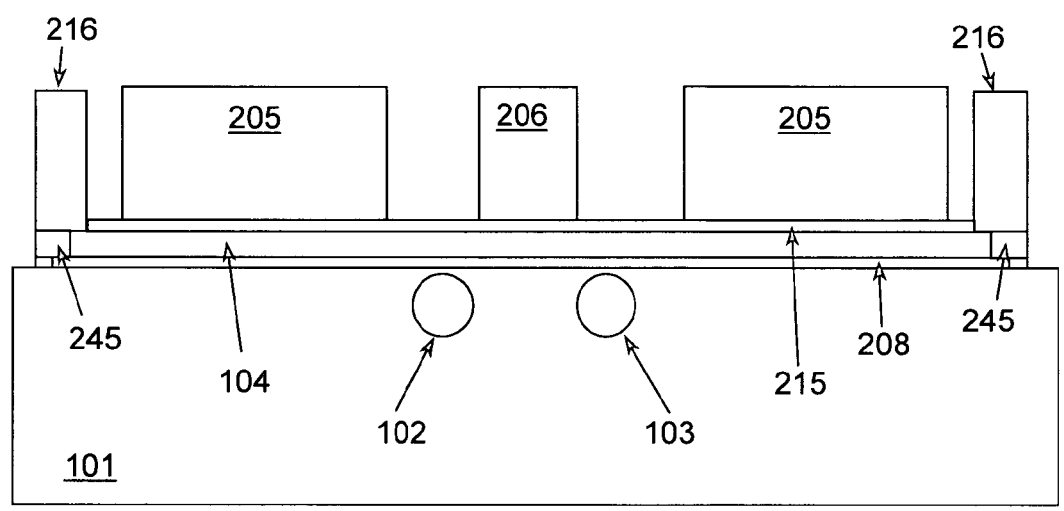
FIG. 14c is a cross-sectional view of the embodiment in FIG. 14a along B-B'.

FIG. 14c shows the cross-section along the section B-B' of the device in FIG. 14a. The encapsulating layer 215 on top of the buffer layer 104 covers the bias signal electrode 208 as it crosses the waveguides 102, 103 to connect to the external terminals 216 at the edges 245.

Figure 15A:
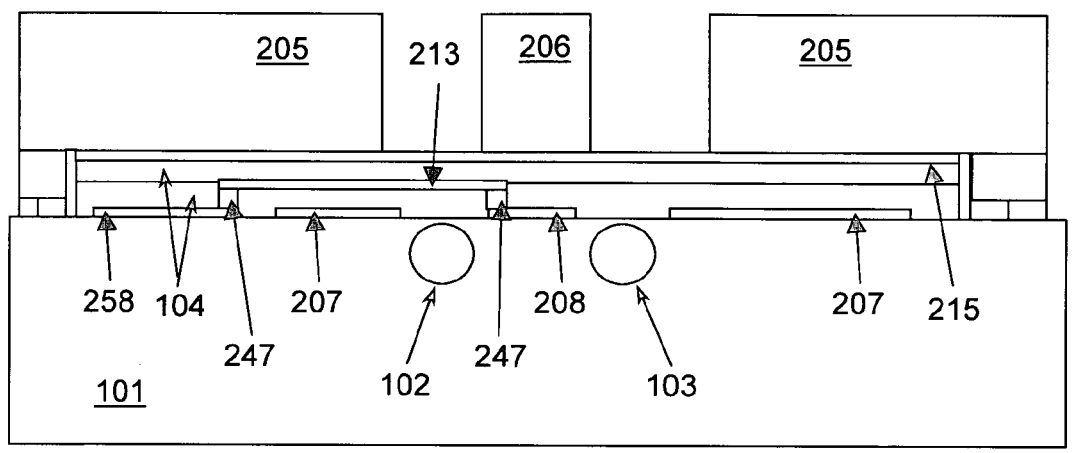
FIG. 15a shows an embodiment similar to that in FIG. 12a which uses interconnecting bridges to connect to the bias signal electrode.

In FIG. 15a, high resistivity vias 247 and an intermediate high resistivity layer 213 vias allow for multilayer interconnection. For example, they can connect the narrow bias signal electrode 208 to a wider bias electrode 258 on the substrate 101 surface, in order to reduce the series resistance of the narrow bias signal electrode. The bias electrodes are DC isolated from the gold RF electrodes. The electrodes 205 may encapsulate the high resistivity layer 215 and buffer layer 104 at the ends, for improved reliability in the presence of humidity.

Figure 15B:
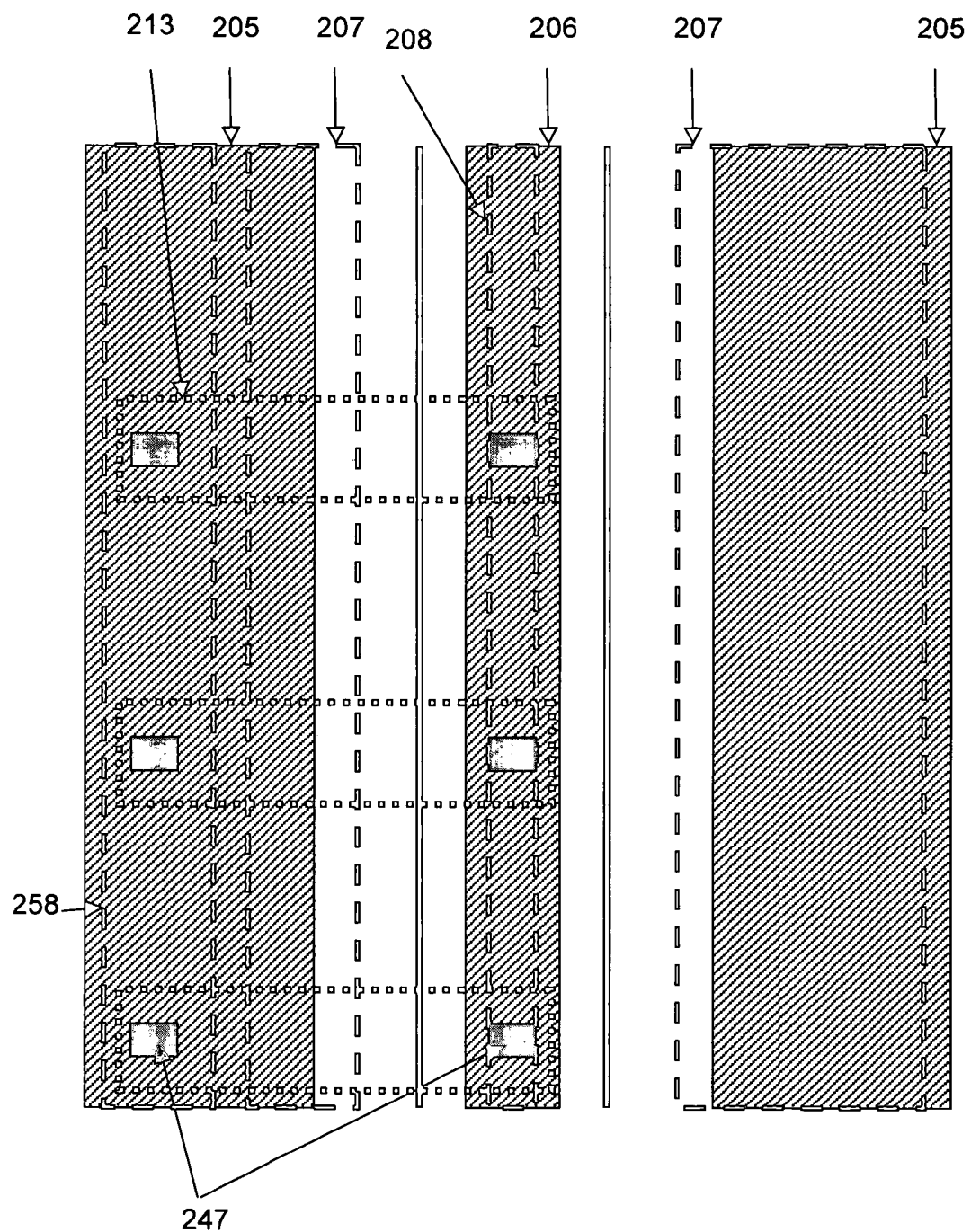

This embodiment is shown in plan in FIG. 15b, where the intermediate layer bridges 213 are shown interconnecting the narrow bias signal electrode 208 to a wider bias electrode 258 through vias 247. Resistivity of all bias electrode layers is high enough to prevent any additional signal strength loss for RF signals traveling in the RF electrodes. However, their resistivity is low enough that their time constant is short enough to prevent bias voltage run-away due to buffer layer charging.

Figure 16A:
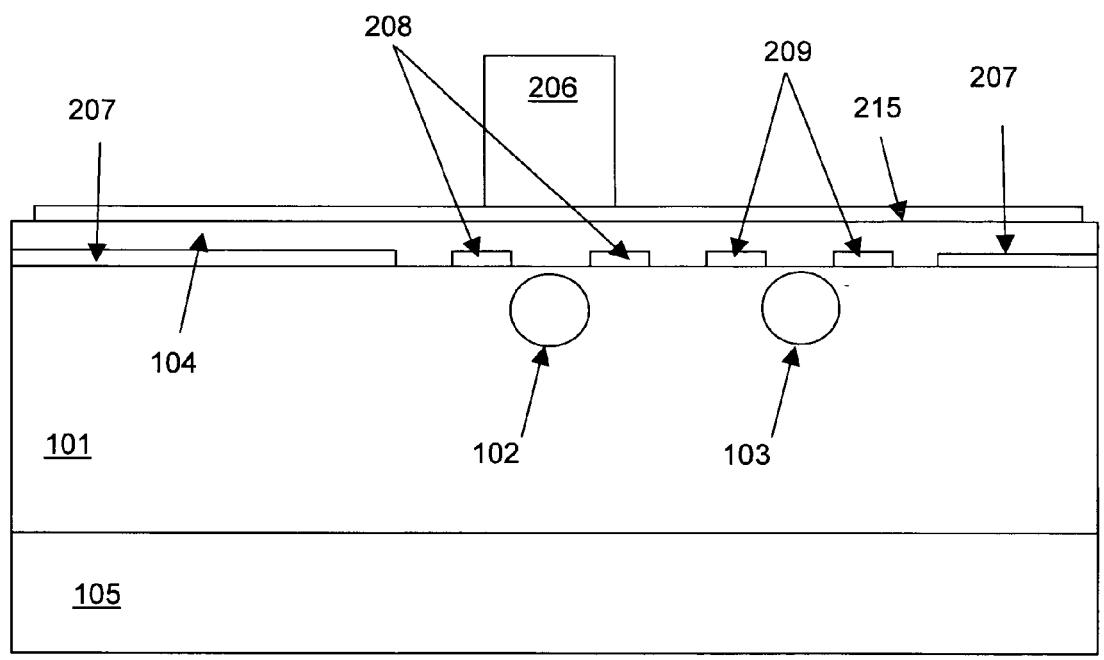
FIG. 16a is a cross-sectional view of a Z-cut embodiment of an electro-optic device where the RF ground electrode is located on the bottom of the substrate.

With the additional design flexibility provided by this invention, several configurations become available for constructing the microwave transmission line used for applying the RF signal to the optical waveguide over typical interaction lengths of 20 mm to 70 mm. FIG. 16a shows the cross-section of an embodiment on Z-cut LiNbO$_3$ in which the substrate 101 has been thinned so that a microstrip line is formed by the RF signal electrode 206 operating in conjunction with a RF ground electrode 105 located on the bottom of the substrate 101.

Figure 16B:
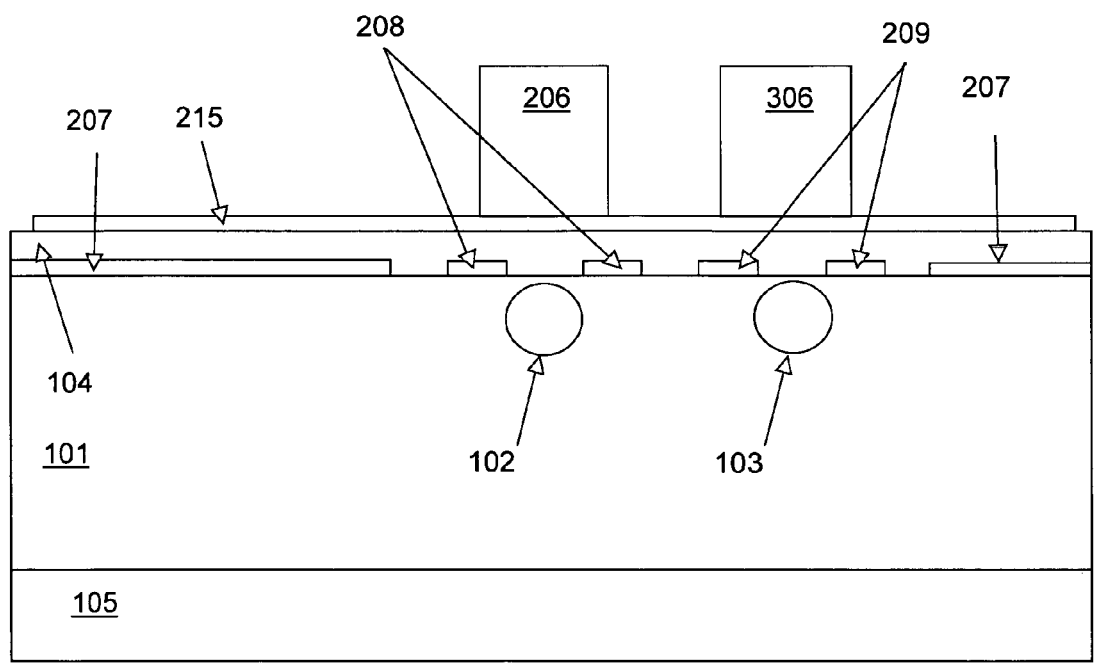
FIG. 16b shows a similar embodiment to that in FIG. 16a but with two RF signal electrodes to enable differential RF drive.
Figure 16C:
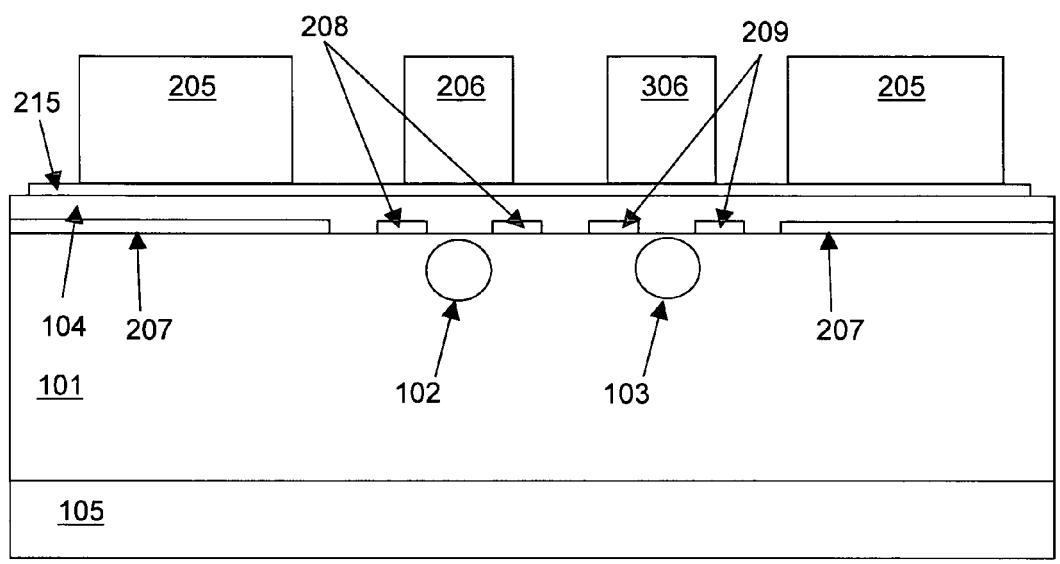
FIG. 16c shows a similar embodiment to that in FIG. 16b but with added coplanar RF ground electrodes.

For differential RF operation, an additional RF electrode 306 can be introduced, as shown in FIG. 16b. In FIG. 16c, a further variation of this embodiment is achieved by the addition of coplanar RF ground electrodes 205.

Figure 16D:
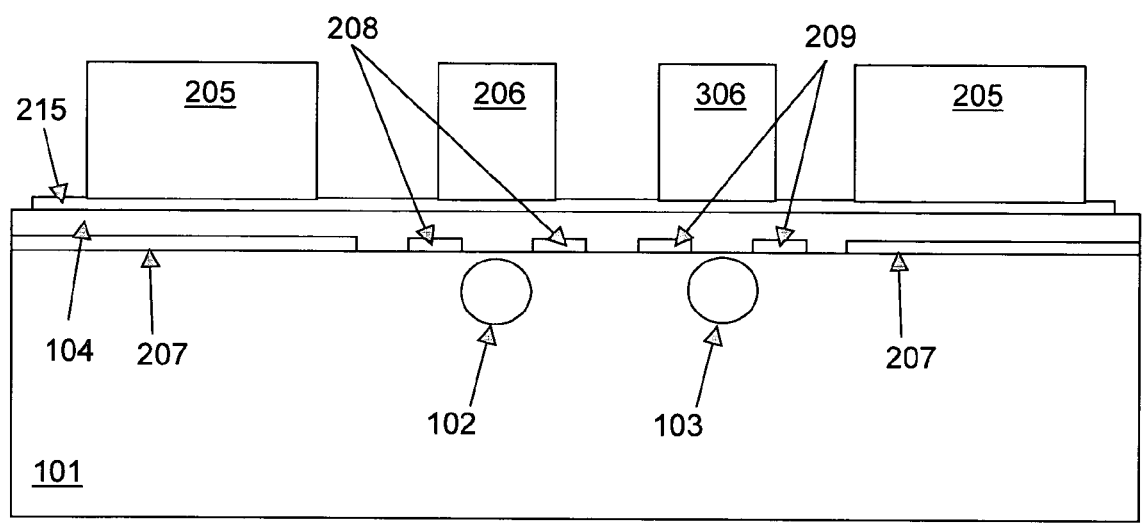
FIG. 16d shows a similar embodiment to that in FIG. 16b but without the RF ground electrode is located on the bottom of the substrate.
Figure 16E:
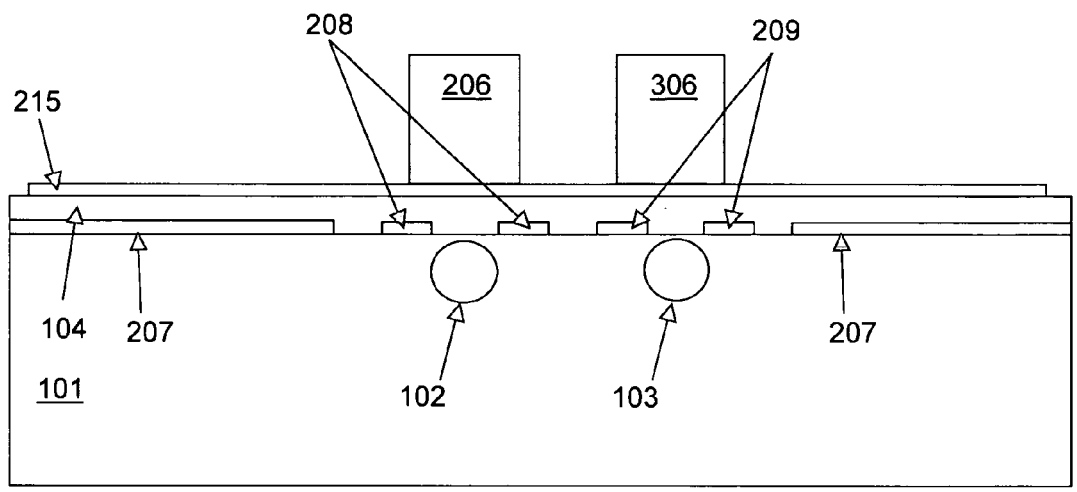
FIG. 16e shows a similar embodiment to that in FIG. 16d but without any gold RF ground electrodes.

FIG. 16d depicts another embodiment derived from that in FIG. 16c by not including the RF ground electrode on the bottom of the substrate 101, such that the RF signal is propagated along the microwave transmission line comprising RF electrodes 205, 206 and 306. In this case, the substrate thickness does not have to be thinned down. Differential operation of the device in FIG. 16d can obviate the need for RF ground electrodes, as illustrated in FIG. 16e.

Figure 17A:
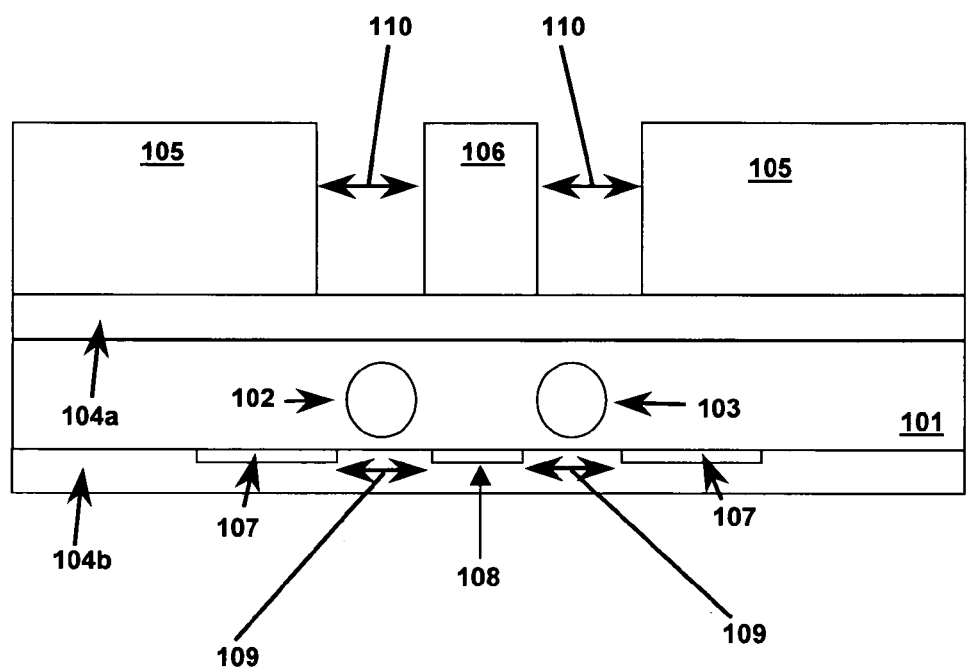
FIG. 17a is a cross-sectional view of the modulator of FIG. 2 taken along line A-A'.

FIG. 17a is the same as FIG. 3a, except the substrate 101 has been made thin, and the bias electrodes 107 and 108 are formed on the bottom of the substrate. The field from the bias electrodes is able to reach the waveguide due to the small thickness of the substrate. There is a buffer layer 104a between the RF electrodes and substrate. In addition, there is a second buffer layer 104b covering the bias electrodes, acting as a protective coating. This embodiment is relevant for x-cut lithium niobate.

Figure 17B:
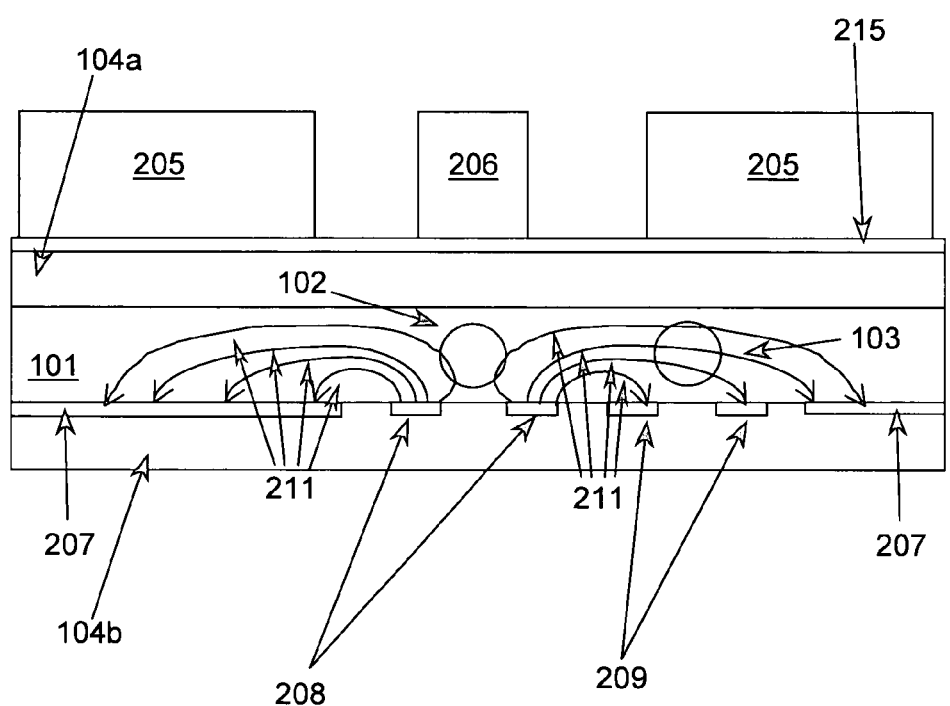
FIG. 17b is a further cross-sectional view of an embodiment of a Z-cut electro-optic device.

FIG. 17b shows an embodiment similar to FIG. 11c, however, as in FIG. 17a, the substrate 101 is made thin, and the bias electrodes 207, 208, and 209 are formed on the bottom of the substrate. The field lines 211 from the bias electrode reach the waveguide due to the small thickness of the substrate. There is a buffer layer 104a between the RF electrodes and substrate. In addition, there is a second buffer layer 104b covering the bias electrodes, acting as a protective coating.

FIG. 17a and 17b permit the use of one material for the buffer layer 104a, while a second, more protective material 104b is used to cover the bias electrodes. The dielectric constant and other properties of material used for 104b need not be the same as that used for 104a, allowing more design flexibility.

Additional embodiments in accordance with the present invention will be apparent to the person skilled in the art as defined in the appended claims.

We claim:

1. An electro-optic device comprising:
an electro-optic substrate including an optical waveguide formed adjacent to an upper surface thereof;
a buffer layer supported by the upper surface of the substrate;
a set of highly conductive RF electrodes comprising at least one signal electrode and at least one ground electrode having an inter-electrode gap therebetween, formed above the buffer layer, which are positioned to receive an RF signal for inducing an electrical field in the optical waveguide; and
a set of bias electrodes comprising at least one signal electrode and at least one ground electrode having an inter-electrode gap therebetween, formed between the substrate and buffer layer and in electrical contact to the substrate that are positioned to receive a bias signal for inducing an electrical field in the optical waveguide.

2. The electro-optic device of claim 1 wherein the bias electrodes are in substantial alignment with the RF electrodes.

3. The electro-optic device of claim 1 wherein the bias electrodes have an electrical resistivity substantially higher than that of the RF electrodes, but substantially lower than the substrate and the buffer layer.

4. The device of claim 1 wherein the inter-electrode gap of the bias electrodes is less than the inter-electrode gap of the high conductivity RF electrodes.

5. The device of claim 1 further comprising at least one conducting via through the buffer layer for providing a bias signal to the bias electrodes.

6. The electro-optic device of claim 1 further comprising a plurality of conducting vias through the buffer layer for reducing the series resistance of the bias electrodes.

7. The device of claim 1 wherein the bias ground electrode and the RF ground electrode are connected to form a common connection.

8. The device of claim 1 wherein the bias signal electrode and the RF signal electrode are connected to form a common connection.

9. The device of claim 1 wherein the bias electrodes comprise separated segments.

10. The device of claim 1 wherein the bias electrodes are formed by the ion implantation of a dopant material which increases the conductivity of the host material.

11. The device of claim 10 wherein the bias electrodes formed by the ion implantation have a thickness equal to that of the buffer layer, thereby forming a conductive path to the device surface.

12. The device of claim 1 wherein the electro-optic device comprises a Mach-Zehnder interferometer.

13. The electro-optic device of claim 1 wherein the substrate material is Lithium Niobate.

14. The electro-optic device of claim 13 wherein the Lithium Niobate is X-cut Lithium Niobate.

15. The electro-optic device of claim 14 where the bias electrodes are positioned with respect to the RF electrodes in a way as to generate an electric field essentially parallel to that generated by the RF electrodes.

16. The electro-optic device of claim 13 wherein the Lithium Niobate is Z-cut Lithium Niobate.

17. The electro-optic device of claim 16 wherein the bias electrodes comprise at least 2 part-electrodes separated along an axis parallel to the optical waveguide and disposed on either side of the optical waveguide.

18. A Mach-Zehnder optical modulator on an electro-optic substrate comprising:
an optical circuit adjacent to an upper surface of the substrate, including a single optical input waveguide, optically coupled to an optical waveguide splitter, optically coupled to a pair of electro-optical waveguides, optically coupled to an optical waveguide combiner, having a single optical waveguide output;
a buffer layer formed directly on the upper surface of the substrate;
a set of highly conductive RF electrodes comprising signal and ground electrodes in a ground—signal—ground configuration thereby forming a planar microwave transmission line located above the buffer layer for receiving a RF signal, the RF signal inducing a differential change in refractive index in the pair of electro-optic waveguides; and a set of bias electrodes comprising signal and ground electrodes in alignment with the RF electrodes, located between the buffer layer and substrate and in contact with the substrate for receiving a bias signal, the bias signal inducing a differential change in refractive index in the pair of electro-optic waveguides.

19. A method of reducing bias drift in a Mach-Zehnder modulator having an electro-optic substrate in which the Mach-Zehnder optical interferometer is formed; a buffer layer between RF electrodes on the device surface and the substrate, wherein the adverse effects of the accumulation of electric charge in the buffer layer are mitigated by applying a bias voltage directly to the substrate through bias electrodes located between the buffer layer and substrate.

20. A method of improving modulation efficiency in a Mach-Zehnder modulator as defined in 18, by positioning the bias electrodes under the RF electrodes to spatially overlap the electric fields induced in the waveguides by the application of signals to the bias and high-frequency RF modulation electrodes.

21. A Mach-Zehnder optical modulator on an electro-optic substrate comprising:
    an optical circuit adjacent to an upper surface of the substrate, including a single optical input waveguide, optically coupled to an optical waveguide splitter, optically coupled to a pair of electro-optical waveguides, optically coupled to an optical waveguide combiner, having a single optical waveguide output;
    a buffer layer formed directly on the upper surface of the substrate;
    a set of highly conductive RF electrodes comprising signal and ground electrodes in a microstrip or coplanar strip configuration forming a planar microwave transmission line, where at least one signal electrode is located above the buffer layer for receiving a RF signal, and in an instance where a microstrip configuration is provided, a ground electrode is located beneath the substrate, the RF signal inducing a differential change in refractive index in at least one of a pair of electro-optic waveguides; and
    a set of bias electrodes comprising a signal and ground electrodes in alignment with the RF electrodes.

22. An electro-optic device comprising:
    an electro-optic substrate having a thickness of 20 microns or less, including an optical waveguide formed adjacent to an upper surface thereof;
    a buffer layer supported by the upper surface of the substrate;
    a set of highly conductive RF electrodes comprising at least one signal electrode and at least one ground electrode having an inter-electrode gap therebetween, formed above the buffer layer, which are positioned to receive an RF signal for inducing an electrical field in the optical waveguide; and
    a set of bias electrodes comprising at least one signal electrode and at least one ground electrode having an inter-electrode gap therebetween, formed on the bottom of the substrate, and in electrical contact to the substrate, that are positioned to receive a bias signal for inducing an electrical field in the optical waveguide.

* * * * *